United States Patent
Zhang et al.

(10) Patent No.: US 11,918,900 B2
(45) Date of Patent: Mar. 5, 2024

(54) SCENE RECOGNITION METHOD AND APPARATUS, TERMINAL, AND STORAGE MEDIUM

(71) Applicant: HUAWEI TECHNOLOGIES CO., LTD., Shenzhen (CN)

(72) Inventors: Fan Zhang, Shenzhen (CN); Yixin Deng, Nanjing (CN); Baocheng Gu, Nanjing (CN); Dong Wei, Shenzhen (CN); Shengqiang Ke, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/389,688

(22) Filed: Jul. 30, 2021

(65) Prior Publication Data
US 2021/0354037 A1    Nov. 18, 2021

Related U.S. Application Data

(63) Continuation of application No. PCT/CN2020/074016, filed on Jan. 23, 2020.

(30) Foreign Application Priority Data

Feb. 1, 2019    (CN) .......................... 201910105807.4

(51) Int. Cl.
*A63F 13/52*    (2014.01)
*A63F 13/35*    (2014.01)
(Continued)

(52) U.S. Cl.
CPC .............. *A63F 13/52* (2014.09); *A63F 13/35* (2014.09); *A63F 13/525* (2014.09);
(Continued)

(58) Field of Classification Search
None
See application file for complete search history.

(56) References Cited

U.S. PATENT DOCUMENTS

| 11,511,188 | B2 * | 11/2022 | Wu | ...................... A63F 13/2145 |
| 2006/0209064 | A1 | 9/2006 | Otani | |

(Continued)

FOREIGN PATENT DOCUMENTS

| CN | 101246599 A | 8/2008 |
| CN | 101770655 A | 7/2010 |

(Continued)

OTHER PUBLICATIONS

Richter, Stephan R., Zeeshan Hayder, and Vladlen Koltun. "Playing for benchmarks." Proceedings of the IEEE International Conference on Computer Vision. 2017. (Year: 2017).*

(Continued)

*Primary Examiner* — Ryan M Gray
(74) *Attorney, Agent, or Firm* — Rimon PC

(57) ABSTRACT

This application discloses a scene recognition method and apparatus, which may be applied to game scene recognition. The method includes: obtaining one or more drawing instructions, and determining a to-be-drawn target object based on a description parameter carried in the one or more drawing instructions. Based on a particular relationship between scenes and an object inside scenes, a corresponding target scene may be determined based on the target object.

15 Claims, 11 Drawing Sheets

(51) Int. Cl.
   *A63F 13/525* (2014.01)
   *G06F 16/532* (2019.01)
   *G06F 16/583* (2019.01)
   *G06F 18/22* (2023.01)
   *G06V 20/10* (2022.01)
   *G06V 20/20* (2022.01)

(52) U.S. Cl.
   CPC ........ *G06F 16/532* (2019.01); *G06F 16/5854* (2019.01); *G06F 18/22* (2023.01); *G06V 20/10* (2022.01); *G06V 20/20* (2022.01)

(56) References Cited

U.S. PATENT DOCUMENTS

| | | | |
|---|---|---|---|
| 2009/0054140 A1* | 2/2009 | Beser | A63F 13/52 463/31 |
| 2011/0251896 A1 | 10/2011 | Impollonia et al. | |
| 2015/0009214 A1 | 1/2015 | Lee et al. | |
| 2015/0187129 A1 | 7/2015 | Sloan | |
| 2015/0287158 A1 | 10/2015 | Cerny et al. | |
| 2017/0278308 A1 | 9/2017 | Bleiweiss et al. | |
| 2021/0046382 A1* | 2/2021 | Wu | A63F 13/85 |

FOREIGN PATENT DOCUMENTS

| | | |
|---|---|---|
| CN | 102157008 A | 8/2011 |
| CN | 104050708 A | 9/2014 |
| CN | 105353871 A | 2/2016 |
| CN | 105488044 A | 4/2016 |
| CN | 106447768 A | 2/2017 |
| CN | 107019901 A | 8/2017 |
| CN | 107393000 A | 11/2017 |
| CN | 107670279 A | 2/2018 |
| CN | 108176048 A | 6/2018 |
| CN | 108421257 A | 8/2018 |
| CN | 108434742 A | 8/2018 |
| CN | 108550190 A | 9/2018 |
| CN | 108648238 A | 10/2018 |
| CN | 108876925 A | 11/2018 |
| CN | 109224442 A | 1/2019 |
| CN | 109285211 A | 1/2019 |
| KR | 20180091794 A | 8/2018 |

OTHER PUBLICATIONS

Krähenbühl, Philipp. "Free supervision from video games." Proceedings of the IEEE conference on computer vision and pattern recognition. 2018.*

Liu Jing et al.,"Scene Classification Based on Gist and PHOG Feature", Apr. 2015; 5 total pages.

Lu Xing-hua et al.,"Adaptive Tracking Scene Rendering Technology Based on Android System", Aug. 26, 2015; 4 total pages.

Liu Jing, Research on the Fast Scene Classification Based on Gist of a Scene, Jilin University, 2013, Issue 08, 2 Pages. Translation of Abstract.

Gao ce, Game Low Power Strategy Research on Android Platform, University of Science and Technology of China, 2015, Issue 09, 2 pages. Translation of Abstract.

\* cited by examiner

SCENE RECOGNITION METHOD AND APPARATUS, TERMINAL, AND STORAGE MEDIUM

CROSS-REFERENCE TO RELATED APPLICATIONS

This application is a continuation of International Application No. PCT/CN2020/074016, filed on Jan. 23, 2020, which claims priority to Chinese Patent 201910105807.4, filed on Feb. 1, 2019. The disclosures of the aforementioned applications are hereby incorporated by reference in their entireties.

TECHNICAL FIELD

This application relates to the field of computer graphics technologies, and in particular, to a scene recognition method and apparatus, a terminal, and a storage medium.

BACKGROUND

With development of technologies, processors of terminals are increasingly powerful in performance, and therefore the terminals can support and run a plurality of large-scale competitive games. To further improve user experience, a terminal manufacturer adds more features that when running a competitive game, the terminal can recognize a game scene of a current image frame of the competitive game, add different special effects for different game scenes, and perform other operations. For example, after recognizing a current game scene, a mobile terminal may add a special effect such as a sound or touch effect for different game scenes.

A scene recognition method is provided in a related technology, and the method is based on an image recognition technology. In the method, a training set is pre-established based on game pictures of a plurality of image frames in a game scene. A game picture of a current image frame is matched with the game pictures of the plurality of image frames in the training set by using the image recognition technology, to obtain, from the training set, a game picture of an image frame that matches the game picture of the current image frame. A game scene corresponding to the matched game picture of the image frame is used as a game scene corresponding to the game picture of the current image frame.

However, in the scene recognition method provided in the related technology, a large quantity of computing resources is consumed during use of the image recognition technology, resulting in relatively high computing costs of a terminal.

SUMMARY

This application provides a scene recognition method and apparatus, a terminal, a storage medium, and the like, to reduce required computing resources of a system.

According to a first aspect, an example embodiment of this application provides a scene recognition method. The method includes: obtaining at least one drawing instruction, where the drawing instruction is used for drawing a target object; determining a target object model of the to-be-drawn target object based on a description parameter of the at least one drawing instruction, where the target object model is a rendering model used for image drawing, and the description parameter indicates vertex information of the target object model; and determining a corresponding target scene based on the target object model.

According to the scene recognition method provided in this embodiment of this application, the target scene can be determined based on the description parameter of the drawing instruction used for object drawing. Compared with a related technology in which a large quantity of computing resources are consumed by using an image recognition technology, the scene recognition method provided in this embodiment of this application effectively reduces system resources.

In some implementations, the determining a corresponding target scene based on the target object model may be determining the corresponding target scene directly based on the target object model. In some other implementations, the determining a corresponding target scene based on the target object model may be determining a corresponding object based on the target object model, and determining the corresponding target scene based on the object. If a computer stores a correspondence between an object model and a scene, the former manner may be used. If a computer stores a correspondence between an object (for example, an identifier of a game character) and a scene, the latter manner may be used. Alternatively, based on another type of correspondence stored in a computer, the method provided in this application may be modified correspondingly, and this shall not be considered as a departure from the scope of this application.

"The at least one drawing instruction" in this application can be understood as "one or more instructions".

In some implementations, one drawing instruction may be used for drawing one object, a plurality of drawing instructions may be used for drawing one object, or one drawing instruction may be used for drawing a plurality of objects. In other words, drawing instructions and objects may be in a one-to-one, one-to-many, or many-to-one relationship. Generally, one drawing instruction is used for drawing one object. An "object" mentioned in this application may be a person or an animal; may be a static object or a dynamic object; and may exist in a background, a foreground, or the like. This is not limited in this application.

In some implementations, the target object model is obtained by matching the vertex information with vertex information of one or more known object models. The vertex information of the one or more known object models may exist in a computer system in a form of a correspondence between vertex information and an object model. The correspondence may be manually entered, or may be obtained through machine learning (equivalent to artificial intelligence) or the like.

In this application, because vertex information carried in a description parameter is different, this application provides at least two implementations of determining the target object model.

In a first implementation, the vertex information includes a vertex set of an object model, one vertex set includes coordinate values of one or more vertices, and the process of determining a target object model may include: obtaining m vertex sets from the description parameter, where m is a positive integer; determining, from the m vertex sets, a target vertex set that matches a vertex set of the one or more known object models; and determining an object model corresponding to the target vertex set as the target object model.

A quantity of vertices included in one vertex set is referred to as a "vertex quantity".

Based on the first implementation, in some implementations, the process of determining, from the m vertex sets, a target vertex set that matches a vertex set of the one or more known object models may include: determining a vertex set in the m vertex sets that has same content and a same quantity of vertices as the vertex set of the one or more known object models, as the target vertex set. To be specific, "matched" means that quantities of vertices in two vertex sets are equal and that coordinates of vertices in one of the two vertex sets are respectively the same as those of vertices in the other vertex set. If the vertices in each of the vertex sets are in sequence, the vertices in one of the two vertex sets should be sequentially in a one-to-one correspondence with the vertices in the other vertex set, and coordinate values of the vertices in one vertex set are respectively the same as those of the vertices in the other vertex set.

Based on the first implementation, in some implementations, the matched target vertex set is determined first based on a vertex quantity of a vertex set and then based on a content of the vertex set. Because vertex quantities of different object models are usually different, rapid selection is first performed based on vertex quantities, and then accurate selection is performed based on a content of vertex sets. This improves efficiency of determining the target object model, and also ensures accuracy of determining the target object model.

In some implementations, the process of obtaining m vertex sets from the description parameter includes: obtaining all vertex sets included in the description parameter, and using all the vertex sets as the m vertex sets; or selecting some vertex sets in the description parameter to obtain the m vertex sets.

In a second implementation, the vertex information includes a vertex quantity of an object model, and the target object model is an object model, whose vertex quantity is equal to a vertex quantity indicated by the description parameter, in the one or more known object models.

It should be noted that the description parameter is used to "indicate" the vertex information, and therefore the description parameter is used to "indicate" the vertex quantity in this implementation. In this case, the description parameter may directly carry a vertex quantity of each vertex set, or may not carry a vertex quantity and carry only a vertex set, because when the vertex set is known, the computer system can calculate a quantity of vertices in the set.

Based on the second implementation, in some embodiments, when the vertex information includes the vertex quantity, the process of determining a target object model may include: obtaining n vertex quantities from the description parameter of the at least one drawing instruction, where n is a positive integer; using each of the n vertex quantities as a first vertex quantity, and determining at least one candidate object model from the one or more known object models, where each of the at least one candidate object model corresponds to a first vertex quantity, and the one or more known object models record a plurality of vertex quantities corresponding to a plurality of known object models; and when there is one candidate object model, determining the candidate object model as a target object model corresponding to a first vertex quantity; or when there is more than one candidate object model, selecting a target object model corresponding to a first vertex quantity from the candidate object models.

In some scenes, determining the target object model through selection based only on the vertex quantity can improve matching efficiency.

In some implementations, the target object model further needs to satisfy the following condition: The target object model matches a target virtual environment, where the target virtual environment corresponds to an image frame to which the target object to be drawn by using the at least one drawing instruction belongs, and the target virtual environment is a virtual environment created by an application program that generates the at least one drawing instruction and is an interactive two-dimensional or three-dimensional environment generated by the application program on a terminal. A process of determining whether the target object model matches the target virtual environment may include: determining the target virtual environment, and selecting, from the candidate object model, an object model that is most similar to an object model in the target virtual environment as the target object model.

Because the condition of matching the target virtual environment is added, accuracy of determining the target object model is ensured.

In some implementations, the process of obtaining at least one drawing instruction includes: obtaining the at least one drawing instruction by listening on an OpenGL interface, where the OpenGL interface is an interface between an OpenGL and an application program.

In some implementations, the process of obtaining the at least one drawing instruction by listening on an OpenGL interface may include: performing a listening and obtaining procedure at least once to obtain the at least one drawing instruction.

In some implementations, the listening and obtaining procedure includes: listening on a first OpenGL interface, where the first OpenGL interface is an interface between the OpenGL and a specified application program, and the specified application program is used for drawing an object in an image frame in the target virtual environment; and after end indication information indicating that one image frame has been drawn is listened and obtained on the first OpenGL interface, obtaining, in a cache of the OpenGL by using a second OpenGL interface, a drawing instruction for the image frame that has been drawn, where the second OpenGL interface is connected to the OpenGL.

The end indication information indicating that one image frame has been drawn is listened on the first OpenGL interface, to accurately learn a time node for obtaining the drawing instruction for the image frame that has been drawn, and obtain at least one drawing instruction based on the time node. This improves effectiveness of the scene recognition method.

In some implementations, before determining a target object model based on a description parameter of the at least one drawing instruction, the method further includes: determining a target virtual environment, where the target virtual environment is corresponding to an image frame to which the target object to be drawn by using the at least one drawing instruction belongs; and obtaining a first correspondence that is between a description parameter and an object model and that is corresponding to the target virtual environment. The first correspondence may include a correspondence between a description parameter and an object model, a correspondence among a description parameter, an object model, and an object, and a correspondence between a description parameter and an object. Certainly, because an object corresponds to an object model, the first correspondence may alternatively include a correspondence between a description parameter and an object model. Correspondingly, the process of determining a target object model based on a description parameter of the at least one drawing instruction may include: querying the first correspondence to obtain the target object model corresponding to the description parameter.

In some implementations, after the determining a target virtual environment, the method further includes: obtaining, from a plurality of relationship sets, a scene determining policy for the target virtual environment, where the plurality of relationship sets record different scene determining policies for a plurality of virtual environments, and a scene determining policy is a policy for determining a corresponding scene based on an object model, or a scene determining policy is a policy for determining a corresponding scene based on an object identifier. If the scene determining policy is a policy for determining a corresponding scene based on an object model, the determining of a corresponding target scene based on the target object model includes: determining the target scene based on the target object model and the scene determining policy of the target object model in the target virtual environment. If the scene is a policy for determining a corresponding scene based on an object identifier corresponding to an object model, the determining of a corresponding target scene based on the target object model includes: determining the target scene based on a target object identifier corresponding to the target object model and the scene determining policy of the target object identifier in the target virtual environment.

The first correspondence between a description parameter and an object model and the scene determining policy for the target virtual environment are obtained based on the determined target virtual environment, so that the obtained first correspondence and scene determining policy can match the target virtual environment. This avoids a case in which memory space of the terminal is occupied by the obtained first correspondence and scene determining policy that do not match the target virtual environment.

In some implementations, the target virtual environment is a gaming environment, and the target scene is determined based on whether the target object model includes a gun and a bullet, whether the target object model includes a plurality of roles, whether a specific role appears in the target object model for the first time, or the like. Specifically, the scene determining policy includes one or more of the following: When the target object model includes object models respectively corresponding to a gun and a bullet (or when the target object includes a gun and a bullet), determining that the target scene is a gun shooting scene; when the target object model includes object models respectively corresponding to at least three roles, determining that the target scene is a group battle scene; or when the target object model in the first image frame includes an object model corresponding to a target role and a target object model in a previous image frame of the first image frame does not include the object model corresponding to the target role, determining that the target scene is a scene in which the target role appears. The "at least three roles" herein may be roles of different types, or may be roles of a same type.

In some implementations, the first image frame includes two consecutive image frames.

In some implementations, the obtaining a first correspondence that is between a description parameter and an object model and that corresponds to the target virtual environment includes: querying the first correspondence stored in a local storage device, or downloading the first correspondence from a server associated with the target virtual environment.

According to the scene recognition method provided in this embodiment of this application, the at least one drawing instruction used for drawing the target object is obtained, the target object model of the to-be-drawn target object is determined based on the description parameter of the at least one drawing instruction, and finally the corresponding target scene is determined based on the target object model. The target scene is determined based on the target object model, and the target object model is determined based on the description parameter of the drawing instruction. Compared with the related technology in which a large quantity of computing resources are consumed by using the image recognition technology, the scene recognition method provided in this embodiment of this application effectively reduces consumption of system resources.

According to a second aspect, an example embodiment of this application provides a scene recognition apparatus. The apparatus includes one or more modules. The one or more modules are configured to implement the scene recognition method according to any one of the implementations of the first aspect.

The scene recognition apparatus provided in this embodiment of this application obtains at least one drawing instruction used for drawing a target object, determines a target object model of the to-be-drawn target object based on a description parameter of the at least one drawing instruction, and finally determines a corresponding target scene based on the target object model. The target scene is determined based on the target object model, and the target object model is determined based on the description parameter of the drawing instruction. In this case, a terminal does not need to perform additional calculation. Compared with a related technology in which a large quantity of computing resources are consumed by using an image recognition technology, a scene recognition method provided in this embodiment of this application effectively reduces system resources.

According to a third aspect, an embodiment of this application provides a computer such as a terminal device, including a processor and a memory. The processor executes a computer program stored in the memory, to implement the scene recognition method according to any one of the implementations of the first aspect.

According to a fourth aspect, an embodiment of this application provides a storage medium. The storage medium may be nonvolatile or non-transitory, and the storage medium stores a computer program. The computer program is used for implementing the scene recognition method according to any one of the implementations of the first aspect.

According to a fifth aspect, an embodiment of this application provides a computer program product (or referred to as a computer program) including an instruction. When the computer program product is run on a computer, the computer is enabled to perform the scene recognition method according to any one of the implementations of the first aspect.

According to the scene recognition method and apparatus, the terminal, and the storage medium that are provided in the embodiments of this application, the at least one drawing instruction used for drawing the target object is obtained, the target object model of the to-be-drawn target object is determined based on the description parameter of the at least one drawing instruction, and finally the corresponding target scene is determined based on the target object model. The target scene is determined based on the target object model, and the target object model is determined based on the description parameter of the drawing instruction. In this case, the terminal does not need to perform a large amount of additional calculation. Compared with the related technology in which a large quantity of computing resources are consumed by using the image recognition technology, the scene recognition method provided in the embodiments of this application effectively reduces system resources.

Based on the implementations provided in the foregoing aspects, this application may be further combined to provide more implementations.

DESCRIPTION OF EMBODIMENTS

Figure 1:
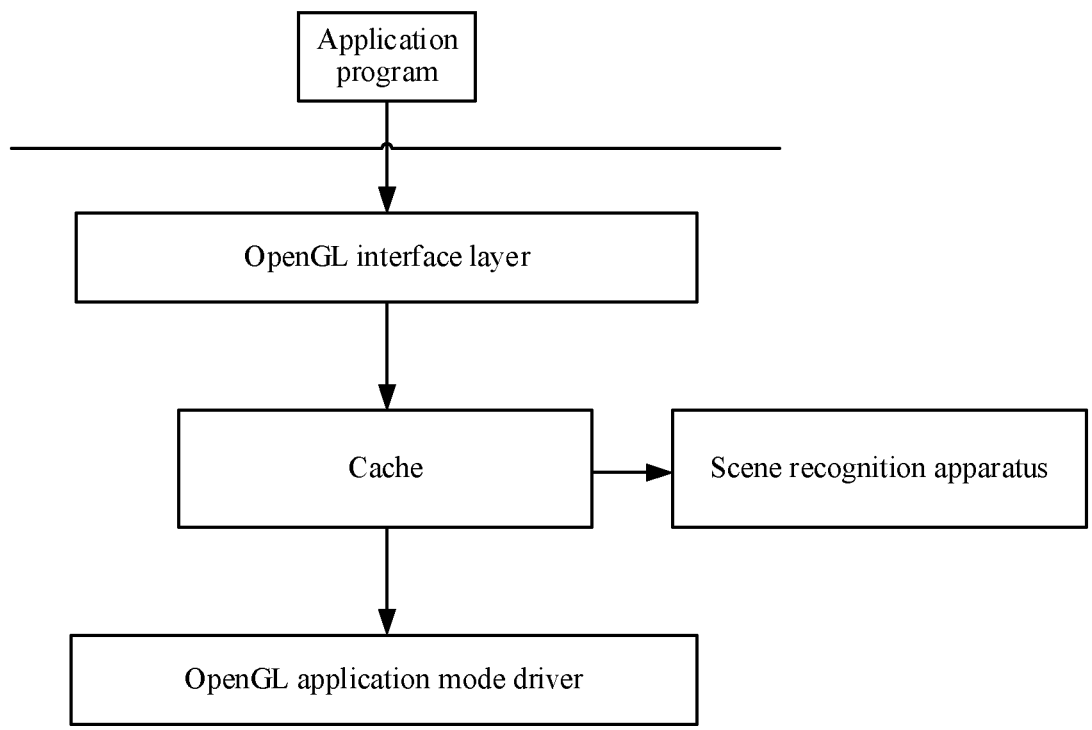
FIG. 1 is a schematic diagram of an application environment in a scene recognition method according to an embodiment of this application.

To make the objectives, technical solutions, and advantages of this application clearer, the following further details the implementations of this application with reference to the accompanying drawings.

As processors of terminals are increasingly powerful in performance, the terminals can support and run a plurality of large-scale competitive games. When a terminal runs a competitive game, the terminal can automatically recognize a game scene of a current image frame of the competitive game, and add different content items for different game scenes. For example, when the terminal is a mobile terminal, where the content item may include a special effect, an advertisement, or the like, after the mobile terminal recognizes a current game scene, the mobile terminal may add a special effect such as a sound or touch effect for different game scenes, or place different advertisements for different game scenes. Therefore, effectively determining the game scene of the current image frame is crucial to improving user experience and increasing a profit of an advertiser.

Two scene recognition methods are provided in a related technology. Based on an image recognition technology, the first method includes: matching a game picture of a current image frame with game pictures of a plurality of image frames in a pre-established training set; and when the current image frame matches an image frame, using a game scene corresponding to a game picture of the matched image frame as a game scene corresponding to the game picture of the current image frame. A second technology includes: querying for a limited quantity of game scenes by using some application programming interfaces provided in a game software development kit (Software Development Kit, SDK).

However, in the first scene recognition method, a large quantity of computing resources need to be consumed during use of the image recognition technology, resulting in relatively high computing costs of a terminal. In addition, if game scenes corresponding to a plurality of frames of game pictures need to be determined or complex game scenes in a large-scale 3D game need to be determined, use performance of the terminal is affected seriously. For example, frame freezing or excessively high power consumption occurs in the terminal. In the second scene recognition method, because game companies usually provide application programming interfaces only for some terminal manufacturers, generality of the scene recognition method is undesirable. Moreover, only a limited quantity of game scenes can be queried for, and consequently the second scene recognition method has a relatively large limitation.

For ease of understanding by readers, before the embodiments of this application are detailed, terms in the embodiments of this application are first interpreted herein.

An OpenGL (Open Graphics Library, open graphics library) defines a set of cross-programming-language and cross-platform application programming interfaces (Application Programming Interface, API), and includes many functions used for processing graphics. For example, the API defined by the OpenGL includes an interface (the interface includes a drawing function such as a drawing function glDrawElements( )) used to draw a two-dimensional image or a three-dimensional image, and further includes an interface (the interface includes a display function such as a function eglSwapBuffers( )) used to present, on a display screen, an image drawn by using the drawing function, and the like. Examples are not enumerated in the embodiments of this application. A function in the OpenGL may be called by using an instruction. For example, the drawing function may be called by using a drawing instruction, to draw a two-dimensional image or a three-dimensional image. In the embodiments of this application, a two-dimensional image and a three-dimensional image are collectively referred to as image frames. It should be noted that, when object drawing is performed by using the OpenGL, one drawing instruction may be used for drawing one object, a plurality of drawing instructions may be used for drawing one object, or one drawing instruction may be used for drawing a plurality of objects. In other words, drawing instructions and objects may be in a one-to-one, one-to-many, or many-to-one relationship. Generally, one drawing instruction is used for drawing one object.

An OpenGL ES (OpenGL for Embedded Systems, open graphics library for embedded systems) is a graphics library, in the OpenGL, that is designed for embedded devices such as a mobile phone, a personal digital assistant (Personal Digital Assistant, PDA), and a game console.

A virtual environment is an interactive two-dimensional or three-dimensional environment generated by an application program on a terminal by using a computer graphics system and various interfaces.

Scenes are scenes in a virtual environment, and each scene is constituted of one or more virtual objects.

For example, an application program is a game application program, and a corresponding virtual environment is a gaming environment. The gaming environment includes a plurality of game scenes, for example, a group battle scene and a gunplay scene.

An embodiment of this application provides a scene recognition method, to resolve problems in the related technology. FIG. 1 is a schematic diagram of an application environment in the scene recognition method. The scene recognition method is performed by a scene recognition apparatus. The scene recognition apparatus is located in a terminal, and the scene recognition apparatus may be implemented by software installed in the terminal. The terminal runs a plurality of application programs. Data of each application program successively passes through an OpenGL interface layer, a cache, and an OpenGL application mode driver. The OpenGL interface layer is used to provide a function in the OpenGL to be called by the application program. The cache is used to store an instruction for calling the function at the OpenGL interface layer by the application program. The OpenGL application mode driver is used to transfer the instruction called by the application program to a GPU, so that the GPU executes the instruction. An interface is disposed between the scene recognition apparatus provided in this embodiment of this application and the cache, and is used for scene recognition by using data in the cache.

In this embodiment of this application, in actual application, an application program may execute the drawing instruction to call a drawing function in the OpenGL or the OpenGL ES from the OpenGL interface layer, so as to implement a related function of drawing a two-dimensional image or a three-dimensional image. For example, when the application program is a game application program, the game application program may execute a drawing instruction to call the drawing function, so as to draw a two-dimensional image or a three-dimensional image that is in the game and that is used for presenting a game scene.

Figure 2:
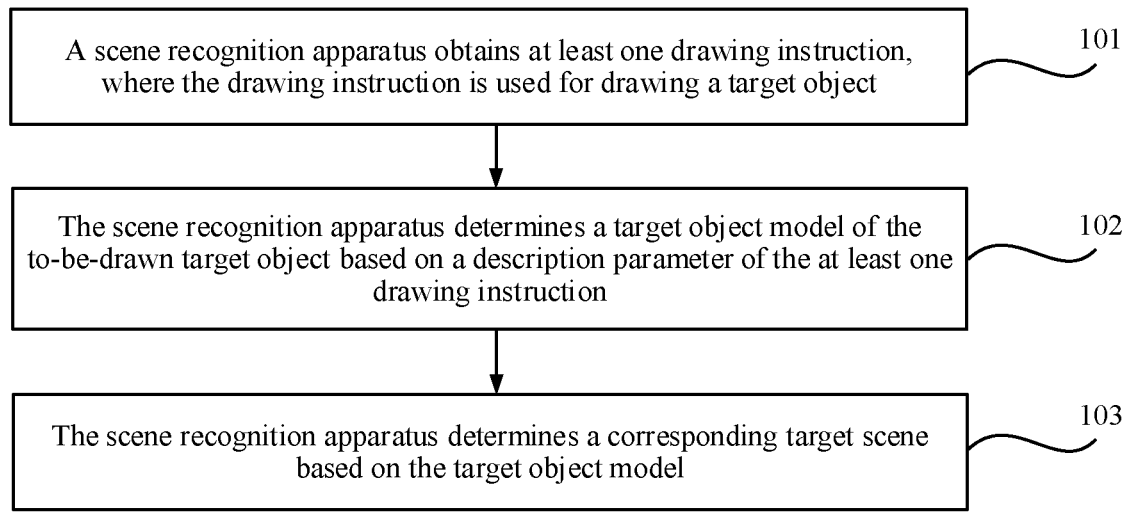
FIG. 2 is a flowchart of a scene recognition method according to an embodiment of this application.

For ease of description, in this embodiment of this application, it is assumed that an application program that is enabled currently is a specified application program. Referring to FIG. 2, the method includes the following steps.

Step 101: The scene recognition apparatus obtains at least one drawing instruction, where the drawing instruction is used for drawing a target object.

It is assumed that a first image frame is a current image frame that needs to be drawn, that is, an image frame to which the target object to be drawn by using the at least one drawing instruction belongs. The first image frame is corresponding to a current scene, and the first image frame may include one image frame or at least two consecutive image frames. For example, the first image frame includes two consecutive image frames.

The scene recognition apparatus may obtain one drawing instruction each time the scene recognition apparatus performs scene recognition. However, to ensure accuracy of a scene recognition result, the scene recognition apparatus can obtain at least two drawing instructions each time the scene recognition apparatus performs scene recognition. Optionally, the scene recognition apparatus may obtain the at least two drawing instructions according to a specified sequence, where the at least two drawing instructions arranged according to the specified sequence are also referred to as drawing instruction streams. The specified sequence is a sequence in which an application program calls the drawing instructions.

A specified application program in the terminal may call a plurality of drawing instructions to draw the first image frame. Each drawing instruction may be used for drawing one object in the first image frame, each drawing instruction may be used for drawing a plurality of objects in the first image frame, or a plurality of drawing instructions may be used for drawing one object in the first image frame.

In this embodiment of this application, in actual implementation, for each image frame, after reading, from a graphics library into an internal memory, a plurality of drawing instructions corresponding to the image frame, the specified application program presents the image frame on a current display screen. In this case, the scene recognition apparatus may read, from the internal memory, the plurality of drawing instructions corresponding to the image frame, and obtain, from the plurality of drawing instructions, at least one drawing instruction for scene recognition. If the first image frame includes at least two consecutive image frames, the scene recognition apparatus may read, from the internal memory, a plurality of drawing instructions corresponding to the at least two image frames, and obtain, from the plurality of drawing instructions, at least one drawing instruction for scene recognition.

The scene recognition apparatus obtains the at least one drawing instruction by listening on an OpenGL interface, where the OpenGL interface is an interface between the OpenGL and an application program.

For example, the process of obtaining the at least one drawing instruction by listening on an OpenGL interface may include: The scene recognition apparatus performs a listening and obtaining procedure at least once to obtain the at least one drawing instruction. The listening and obtaining procedure may include the following steps.

Step A1: Listen on a first OpenGL interface, where the first OpenGL interface is an interface between the OpenGL and the specified application program, and the specified application program is used for drawing an object in an image frame in a target virtual environment.

The target virtual environment is corresponding to the image frame to which the target object to be drawn by using the at least one drawing instruction belongs, and the target virtual environment is a virtual environment created by an application program (that is, the specified application program described above) generating the at least one drawing instruction and is an interactive two-dimensional or three-dimensional environment generated by the application program on the terminal. Therefore, a user can be immersed in this environment.

The first OpenGL interface is a specified interface in the programming interfaces defined in the OpenGL, and a function may be added to the specified interface, where the function may be used for sending end indication information. When one image frame has been drawn, the specified interface is called to automatically trigger the function for sending the end indication information indicating that the image frame has been drawn.

Step A2: After end indication information indicating that one image frame has been drawn is listened and obtained on the first OpenGL interface, obtain, in the cache of the OpenGL by using a second OpenGL interface, a drawing instruction for the image frame that has been drawn, where the second OpenGL interface is connected to the OpenGL.

In terms of a drawing instruction for each image frame, before the image frame has been completely drawn, the drawing instruction used for drawing the image frame may be stored in the cache of the OpenGL. The cache of the OpenGL may be corresponding to a storage area (which is also referred to as storage space) in the internal memory, and the internal memory may be implemented by a random-access memory (RAM). The second OpenGL interface is a specified interface in the programming interfaces defined in the OpenGL. The scene recognition apparatus may obtain, in the cache by using the second OpenGL interface, the drawing instruction used for drawing the image frame.

Generally, the application program may call the drawing function in the OpenGL to perform image drawing, and a drawing instruction for calling the drawing function is cached in the internal memory. In a specific condition, the internal memory sends the drawing instruction to a graphics card memory (which is also referred to as a frame buffer, and is configured to store rendering data that has been processed or that is to be extracted by a graphics chip) by using a CPU. Under the control of the GPU, the application program draws an image frame based on the drawing instruction sent to the graphics card memory, and calls a display interface in the OpenGL to display, on a display screen, an image frame that has been drawn.

Because the first image frame has been drawn when the specified application program calls the display function in the OpenGL, in this embodiment of this application, the display interface in the OpenGL may be selected as the first OpenGL interface, and another function is called in the display interface.

For example, the display interface may be an eglSwapBuffer interface. When one image frame has been drawn, the specified application program may call the eglSwapBuffer interface to present, on a display screen, the image frame that has been drawn. In this case, a function for sending end indication information is added to the eglSwapBuffer interface. When the specified application program calls the eglSwapBuffer interface, the function is triggered for sending the end indication information. After the end indication information indicating that one image frame has been drawn is listened and obtained on the eglSwapBuffer interface, the scene recognition apparatus may obtain, in the cache of the OpenGL by using the second OpenGL interface, a drawing instruction for the image frame that has been drawn.

Certainly, before step A1 is performed, the scene recognition apparatus needs to register with a registration list of the scene recognition apparatus for a called event used for listening on the first OpenGL interface. After step A2 is completed, the scene recognition apparatus needs to deregister, from the registration list of the scene recognition apparatus, the called event used for listening on the first OpenGL interface.

Step 102: The scene recognition apparatus determines a target object model of the to-be-drawn target object based on a description parameter of the at least one drawing instruction.

Figure 3:
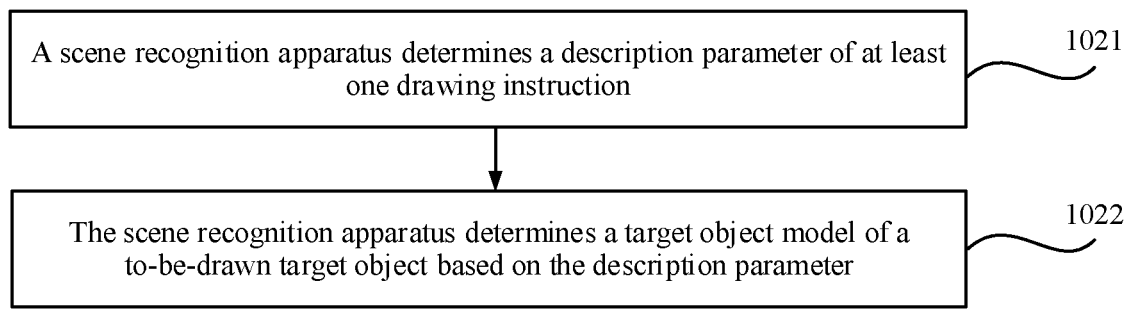
FIG. 3 is a flowchart of a process of determining a target object model according to an embodiment of this application.

Optionally, as shown in FIG. 3, step 102 may include the following steps.

Step 1021: The scene recognition apparatus determines the description parameter of the at least one drawing instruction.

When the application program calls the drawing function in the OpenGL by using a drawing instruction, where the drawing instruction includes a related parameter of an object corresponding to the drawing instruction, and the related parameter includes a description parameter used for object description, the scene recognition apparatus may extract a description parameter from each of the at least one drawing instruction. In other words, the scene recognition apparatus may determine at least one description parameter based on each of the at least one drawing instruction.

It should be noted that, there may be a plurality of types of description parameters used for object description. For example, parameters such as color and shape may be used for object description. In the field of computer graphics technologies, an object may be represented by an object model. In this case, a description parameter may be a related parameter used for describing an object model, and the object model is a rendering model that is established for an object and that is used for image rendering. The object model includes a plurality of vertices (where the plurality of vertices are also referred to as discrete-point arrays, model point clouds, or the like) on an object surface, and in this case, the description parameter is a parameter that can indicate vertex information of the object model.

Generally, vertex quantities of different object models may be different, and therefore an object model corresponding to a vertex quantity may be determined based on the vertex quantity of the object model. In addition, vertices have different attribute information. The attribute information may include position coordinate values, texture data, and other information of each vertex, and attribute information of a plurality of vertices that are included in different object models are different. Therefore, an object type can be determined based on attribute information of vertices included in an object model. Vertex information may include a vertex quantity of an object model and attribute information of each vertex.

For example, the scene recognition apparatus may determine at least one description parameter based on a drawing instruction "glDrawElements(mode=GL_TRIANGLES, count=4608, type=GL_UNDIGNED_SHOT, indices=NULL)" used for drawing an object model. In the drawing instruction, "count" corresponds to a parameter value 4608. Every three parameter values are used to indicate one vertex, in other words, a ratio between a parameter value and a vertex quantity is 3:1. In this case, a vertex quantity of the object model corresponding to the parameter value 4608 is 4608/3, that is, 1536. Therefore, the scene recognition apparatus may determine a description parameter, that is, the vertex quantity of the object model, based on the drawing instruction. Certainly, different drawing instructions may correspond to different parameters, and therefore methods for obtaining description parameters based on the parameters may differ. Examples are not enumerated in the embodiments of this application.

Step 1022: The scene recognition apparatus determines the target object model of the to-be-drawn target object based on the description parameter.

The target object model is a rendering model that is established for the target object and that is used for image drawing. As described above, one drawing instruction may be corresponding to one description parameter or may be corresponding to a plurality of description parameters, and each description parameter may be corresponding to one target object model. Correspondingly, a scene recognition module may determine a target object model of one or more to-be-drawn target objects based on a description parameter of each drawing instruction.

In this embodiment of this application, in an actual implementation, an object may be corresponding to an object identifier, and an object identifier can be used to uniquely identify an object in a specified application program. For example, the object identifier may include a name of the object, a posture of the object, a role name of the object, a props name, or the like. An object model may correspond to a model identifier, and a model identifier can be used to uniquely identify an object model in the specified application program. An object corresponds to an object model, and therefore an object identifier corresponds to an object model and a model identifier.

It should be noted that, for one object, because the object may be in different forms and may have different drawing angles, the object may have a plurality of object models. Corresponding, one object identifier may correspond to a plurality of model identifiers. Certainly, usually, one object identifier may alternatively correspond to one model identifier.

A model identifier and an object identifier each may be represented in a form of a character string, where the character string includes a number, a letter, and/or a text. For example, the object identifier may be a name or a code of an object. When an object is in a one-to-one correspondence with an object model, an object identifier and a model identifier may be a same identifier, that is, two identifiers are multiplexed; certainly, an object identifier and a model identifier may alternatively be different identifiers. When an object is in a one-to-many relationship with an object model, an object identifier and a model identifier may be different identifiers. For example, the model identifier is an index number and the object identifier is an object name.

Optionally, the target object model is obtained by matching the vertex information with vertex information of one or more known object models. The one or more known object models, together with a model identifier (for example, an index number) corresponding to each object model, may be associatively stored in the terminal. An object model corresponding to a model identifier can be uniquely obtained in the terminal by using the model identifier (for example, the model identifier points to the object model by using a pointer).

Based on different vertex information of the target object model, description parameters indicating the vertex information are different, and manners in which the scene recognition apparatus determines the target object model of the to-be-drawn target object based on the description parameters are also different. This embodiment of this application provides two implementations of determining the target object model of the to-be-drawn target object.

In a first implementation, the vertex information includes attribute information of a vertex. Optionally, the attribute information may be a vertex set.

Each object model has a specific quantity of vertices, each vertex corresponds to a vertex set represented by using three-dimensional coordinate values, and the vertex set may be used to represent position coordinate values in attribute information of vertices. One vertex set includes coordinate values of one or more vertices. The vertex quantity and the vertex set including the vertices whose quantity is the vertex quantity may be used as vertex information indicated by a description parameter, and are used to describe an object model of an object (in the following description, an object name is used as an object identifier to represent an object).

It should be noted that one vertex set may be represented in a form of a vertex array, and one vertex array refers to one or more vertices represented in a form of an array, where the array is an ordered element sequence.

For example, for an object model of a tree, the object model has 361 vertices, and the 361 vertices are corresponding to a vertex array $\{<-0.66891545, -0.29673234, -0.19876061>, <-0.5217651, 0.022111386, -0.3163959>, <-0.84291315, -0.103498506, -0.14875318>, \ldots \}$. The vertex array includes 361 arrays, each array represents one vertex, each array includes three elements, and the three elements represent coordinate values of one vertex. The vertex quantity and the vertex array may be used as description parameters of the tree for describing the object model of the tree.

Then, the process of determining the target object model of the to-be-drawn target object may include the following steps.

Step Y1: The scene recognition apparatus obtains m vertex sets from the description parameter, where m is a positive integer.

Optionally, manners in which the scene recognition apparatus obtains m vertex arrays from the determined description parameter may include the following two optional implementations.

In a first optional implementation, the scene recognition apparatus may obtain all vertex sets included in the description parameter, and use all the vertex sets as the m vertex sets.

In a second optional implementation, the scene recognition apparatus may select some vertex sets in the description parameter to obtain the m vertex sets. For example, m=10.

In the first optional implementation, all the vertex sets in the determined description parameter can be traversed, ensuring scene recognition accuracy. However, when there are a large quantity of determined description parameters, if the first optional implementation is chosen, relatively high computing costs of the terminal are caused. Therefore, to improve computing efficiency of the terminal, the second optional implementation may be chosen. To be specific, some description parameters are selected from the determined description parameter, and a vertex set in the some description parameters is used as the m vertex sets, to reduce computing costs.

The process of selecting some vertex sets in the description parameter may include: selecting some description parameters in the description parameter, and using a vertex set corresponding to the some description parameters as the m vertex sets. Further, the process of selecting some description parameters in the description parameter may include: randomly selecting some description parameters from the determined description parameter; or collecting statistics on an occurrence frequency of the drawing instruction corresponding to the determined description parameter, and selecting a description parameter corresponding to a drawing instruction with a relatively low occurrence frequency. Because an object drawn by using the drawing instruction with a relatively low occurrence frequency is distinctive, it is conducive to accurately determining a target scene.

Step Y2: The scene recognition apparatus determines, from the m vertex sets, a target vertex set that matches a vertex set of the one or more known object models.

Optionally, the scene recognition apparatus may determine a vertex set in the m vertex sets that has a same content and a same quantity of vertices as the vertex set of the one or more known object models, as the target vertex set. The process of determining the target vertex set may include the following steps.

Step S1: The scene recognition apparatus uses each of the m vertex sets as a first vertex set, and determines at least one candidate vertex set from the vertex set of the one or more known object models, where each of the at least one candidate vertex set has a first vertex quantity, the vertex set of the one or more known object models records a plurality of vertex sets corresponding to known object identifiers, and the first vertex quantity is a vertex quantity of the first vertex set.

Table 1 lists an example correspondence between vertex sets of a plurality of known object models and other parameters. The other parameters include an index number, a vertex quantity of an object model, and an object identifier. In the vertex sets, an object identifier is represented by an object name, and a model identifier is represented by an index number; an object identifier is in a one-to-one correspondence with an index number; and there is a correspondence among a vertex quantity of an object model, a vertex set of an object model, and an object identifier. Therefore, an object identifier of an object described by a vertex quantity of an object model and a vertex set of the object model can be determined based on the vertex quantity of the object model and the vertex set of the object model. For example, a vertex quantity of an object model whose object identifier is "king" is 1243, a corresponding vertex set is {<−0.65454495, −0.011083424, −0.027084148>, <−0.8466003, 0.026489139, −0.14481458>, <−0.84291315, −0.103498506, −0.14875318>, . . . }, and an index number of the object model whose object identifier is "king" is 25.

TABLE 1

| Index number | Vertex quantity of an object model | Vertex set of the object model | Object identifier |
|---|---|---|---|
| . . . | . . . | . . . | . . . |
| 25 | 1243 | {<−0.65454495, −0.011083424, −0.027084148>, <−0.8466003, 0.026489139, −0.14481458>, <−0.84291315, −0.103498506, −0.14875318>, . . . } | King |
| 26 | 1068 | {<−0.66100085, −0.05258888, −0.39557597>, <−0.7437186, −0.17510048, −0.26660368>, <−0.6854788, −0.24214375, −0.39715803>, . . . } | Soldier |
| 27 | 361 | {<−0.66891545, −0.29673234, −0.19876061>, <−0.5217651, 0.022111386, −0.3163959>, <−0.84291315, −0.103498506, −0.14875318>, . . . } | Tree |
| . . . | . . . | . . . | . . . |

It should be noted that Table 1 is only an example table. In an actual implementation, the other parameters in Table 1 may include only at least two of an index number, a vertex quantity of an object model, and an object identifier, or include any one of an index number, a vertex quantity of an object model, and an object identifier.

Further, in step S1, the process of using, by the scene recognition apparatus, each of the m vertex sets as a first vertex set, and determining at least one candidate vertex set from the vertex set of the one or more known object models includes: using each of the m vertex sets as the first vertex set, and performing a set selection process.

The set selection process may include the following steps.

Step B1: The scene recognition apparatus determines the first vertex quantity of the first vertex set.

The scene recognition apparatus selects any vertex set in the description parameter, and determines a first vertex quantity of the vertex set.

Certainly, alternatively, the scene recognition apparatus may directly use the vertex quantity extracted from the drawing instruction, as the first vertex quantity; and determine a vertex set corresponding to the first vertex quantity as the first vertex set.

Step B2: The scene recognition apparatus detects whether the vertex set of the one or more known object models includes a vertex set whose corresponding vertex quantity is the first vertex quantity.

Step B3: When the vertex set of the one or more known object models includes a vertex set whose corresponding vertex quantity is the first vertex quantity, the scene recognition apparatus determines the vertex set whose corresponding vertex quantity is the first vertex quantity, as a candidate vertex set.

Each of the candidate vertex set has a first vertex quantity.

Step B4: When the vertex set of the one or more known object models does not include a vertex set whose corresponding vertex quantity is the first vertex quantity, the scene recognition apparatus updates a next vertex set of the first vertex set to the first vertex set, and performs a set selection process again.

In this embodiment of this application, in an actual implementation, the scene recognition apparatus may configure the m vertex sets as a queue with a length of m; and starting from the first element in the queue, perform the set selection process including step B1 to step B4 successively, until all elements in the queue are traversed.

Step S2: The scene recognition apparatus compares the first vertex set with each of the at least one candidate vertex set, to obtain the target vertex set that matches the first vertex set.

For example, "matched" means that content of vertex sets are the same and quantities of vertices are equal.

Vertex quantities of different object models may be equal. Therefore, after each of the at least one candidate vertex set that has a first vertex quantity is determined in step S1, comparison of vertex set content (for example, coordinates values in vertex sets) is performed on the at least one candidate vertex set, to perform further selection, thereby accurately determining an object identifier.

Step Y3: The scene recognition apparatus determines an object model corresponding to the target vertex set as the target object model.

Optionally, the scene recognition apparatus may determine, by querying a correspondence or in another manner, a model identifier corresponding to the target vertex set, and determine an object model corresponding to the model identifier as the target object model. The correspondence may be stored in a tabular form.

For example, the target vertex set is {<−0.66891545, −0.29673234, −0.19876061>, <−0.5217651, 0.022111386, −0.3163959>, <−0.84291315, −0.103498506, −0.14875318>, . . . }. A model identifier is obtained by querying Table 1, that is, an index number is 27. In this case, the target object model is a "tree" model.

In this embodiment of this application, in an actual implementation, different object models corresponding to a same vertex quantity differ in respective vertex sets actually. Therefore, in the second optional implementation, selecting some vertex sets in the description parameter as the m vertex sets can ensure scene recognition accuracy, reduce computing costs, and improve scene recognition efficiency.

In a second implementation, the vertex information that is of the target object model and that is indicated by the description parameter includes a vertex quantity of an object model, and likewise, the target object model is a rendering model used for image rendering. In this case, the target object model that is of the to-be-drawn target object and that is determined based on the description parameter of the at least one drawing instruction is an object model, whose vertex quantity is equal to a vertex quantity indicated by the description parameter, in the known object model.

Further, the process of determining, by the scene recognition apparatus, the target object model of the to-be-drawn target object may include the following steps.

Step Y4: The scene recognition apparatus obtains n vertex quantities from the description parameter of the at least one drawing instruction, where n is a positive integer.

Similar to step Y1, the n vertex quantities may be all vertex quantities included in the description parameter determined by the scene recognition apparatus, or may be some vertex quantities selected by the scene recognition apparatus from the determined description parameter.

To reduce computing costs and improve computing efficiency of the terminal, the n vertex quantities may be some vertex quantities in the description parameter. For example, n=10.

Step Y5: The scene recognition apparatus uses each of the n vertex quantities as a first vertex quantity, and determines at least one candidate object model from the known object model, where each of the at least one object model corresponds to a first vertex quantity, and the known object model records a vertex quantity corresponding to the one or more known object models.

Table 2 lists an example correspondence between vertex quantities of a plurality of known object models and other parameters. The other parameters include an index number and an object identifier. In the plurality of object models, an object identifier is represented by an object name, and an object model is represented by an index number; an object identifier is in a one-to-one correspondence with an index number; and there is a correspondence between a vertex quantity of an object model and an object identifier. Therefore, an object identifier of an object described by a vertex quantity of an object model can be determined based on the vertex quantity of the object model. For example, a vertex quantity of an object model whose object identifier is "king" is 1243, and an index number of the object model is 25.

TABLE 2

| Index number | Vertex quantity of an object model | Object identifier |
| --- | --- | --- |
| ... | ... | ... |
| 25 | 1243 | King |
| 26 | 1068 | Soldier |
| 27 | 361 | Tree |
| 28 | 361 | Pistol |
| ... | ... | ... |

It should be noted that Table 2 is only an example table. In an actual implementation, the other parameters in Table 2 may include only an index number and/or an object identifier.

Step Y6: When there is one candidate object model, the scene recognition apparatus determines the candidate object model as a target object model corresponding to a first vertex quantity.

For example, if a vertex quantity determined by the scene recognition apparatus is 1068, in Table 2, only an index number 26 is corresponding to the vertex quantity 1068. In this case, it can be determined that there is one candidate object identifier, and the scene recognition apparatus determines a "soldier" object model as a target object model corresponding to the first vertex quantity.

Step Y7: When there is more than one candidate object model, the scene recognition apparatus selects a target object model corresponding to a first vertex quantity from candidate object identifiers.

For example, if a vertex quantity determined by the scene recognition apparatus is 361, in Table 2, object identifiers 27 and 28 correspond to the vertex quantity 361. In this case, it can be determined that there are two candidate object models, and the scene recognition apparatus further needs to select a target object model from "tree" and "pistol" object models.

Optionally, the process of selecting, by the scene recognition apparatus, a target object model from the candidate object model may include the following steps.

Step C1: The scene recognition apparatus determines a target virtual environment to which the first image frame belongs.

The target virtual environment is a virtual environment to which the current image frame that needs to be drawn (namely, the first image frame) belongs, and is an interactive two-dimensional or three-dimensional environment generated by a specified application program on the terminal. One target virtual environment is correspondingly set for one specified application program, and different target virtual environments may correspond to different objects. For example, when the specified application program is a game application program, the target virtual environment is a gaming environment in the game application program. Different game application programs may have different types of gaming environments. For example, a gunplay-type game application program usually includes an object such as a pistol, a rifle, or a jeep; a history-type game application program usually includes various historical figures. For another example, when the specified application program is a payment-type application program, the target virtual environment may be a transaction environment, where the transaction environment usually includes an object such as a weight or a currency.

Each target virtual environment may correspond to a plurality of object models. In this embodiment of this application, in an actual implementation, several object models that can be used to represent the target virtual environment may be selected from the plurality of object models. The several object models may be a plurality of object models that appear in the target virtual environment; or may be object models that are exclusive to the target virtual environment, facilitating determination of the target object model.

The process of selecting several object models that can be used to represent the target virtual environment may be completed by a developer of an application program. When the terminal runs the application program, the scene recognition apparatus in the terminal can automatically obtain a selection result.

Step C2: The scene recognition apparatus selects, from the candidate object model, an object model that matches the target virtual environment as the target object model.

The scene recognition apparatus may compare the candidate object model with a plurality of object models that may appear in the target virtual environment; and if a candidate object model is consistent with an object model, may determine the candidate object model as the target object model.

For example, if the current target virtual environment is a history-type gaming environment, when the candidate object models are "tree" and "pistol" object models, the "tree" object model appears in a plurality of object models that represent the history-type gaming environment, and hypothetically, the "pistol" model appears in the plurality of object models that represent the history-type gaming environment. The "tree" object model may be determined as the target object model whose vertex quantity is 361.

Alternatively, a type of the candidate object model may be compared with types of a plurality of object models that may appear in the target virtual environment; and if a type of a candidate object model is consistent with a type in the target virtual environment, the candidate object model may be determined as the target object model.

Optionally, before step 102, the scene recognition method may further include the following steps.

Step D1: The scene recognition apparatus determines the target virtual environment, where the target virtual environment is a virtual environment to which the first image frame belongs, and the first image frame is the image frame to which the target object to be drawn by using the at least one drawing instruction belongs.

Step D2: The scene recognition apparatus obtains a first correspondence that is between a description parameter and an object model and that corresponds to the target virtual environment.

The first correspondence may include a correspondence between a description parameter and an object model, a correspondence among a description parameter, an object model, and an object, and a correspondence between a description parameter and an object. Certainly, because an object corresponds to an object model, the first correspondence may alternatively include a correspondence between a description parameter and an object model. That the first correspondence includes the correspondence between a description parameter and an object model is used as an example for description in embodiments of this application.

Correspondingly, the process of determining, by the scene recognition apparatus, the target object model of the to-be-drawn target object based on the description parameter in step 1022 may include: The scene recognition apparatus queries the first correspondence to obtain the target object model corresponding to the description parameter.

Different target virtual environments may correspond to different first correspondences between a description parameter and an object model. Therefore, to improve accuracy and efficiency of determining an object model of an object described by a description parameter, a first correspondence corresponding to a target virtual environment may be obtained in advance.

Optionally, because object identifiers included in different application programs greatly differ, a developer of an application program may provide a first correspondence, corresponding to the application program, between a description parameter and an object model.

Optionally, the first correspondence may be stored in a local storage device of the terminal. For example, the first correspondence may be stored in a flash memory of the terminal (for example, when the terminal is a mobile terminal, the flash memory may be a multimedia card (Embedded Multi Media Card, eMMC)), or the first correspondence may be stored in a server associated with the target virtual environment, for example, stored on a cloud side associated with the target virtual environment.

Then, the process of obtaining, by the scene recognition apparatus, a first correspondence that is between a description parameter and an object model and that corresponds to the target virtual environment may include: querying whether the local storage device stores the first correspondence corresponding to the target virtual environment; and when the local storage device does not store the first correspondence corresponding to the target virtual environment, downloading the first correspondence corresponding to the target virtual environment from the server associated with the target virtual environment. The downloaded first correspondence corresponding to the target virtual environment may be stored in the local storage device.

The first correspondence may be stored in a form of a database file (for example, gamemodel.db). Optionally, each target virtual environment may be corresponding to one database file, and an index entry may be set, based on a name of a target virtual environment (or a name of an application program), for the first correspondence (that is, the database file) stored in the local storage device. The scene recognition apparatus may query, based on the name of the target virtual environment, whether the local storage device stores the corresponding first correspondence. In this way, when the local storage device stores first correspondences corresponding to a plurality of target virtual environments, whether the local storage device stores a first correspondence can be rapidly queried based on the names of the target virtual environments.

In this embodiment of this application, in an actual implementation, a process of determining a name of a target virtual environment may include: When a specified application program is enabled, the specified application program first needs to initialize a target virtual environment corresponding to the specified application program. In this case, the specified application program needs to call an initialization interface in the OpenGL to run the target virtual environment corresponding to the specified application program, where a function for obtaining a process name of a process that is currently running may be set in the initialization interface. Then, a name of the target virtual environment is determined based on a preset correspondence between a process name and a name of a target virtual environment.

For example, the specified application program may call an eglInitialize interface to initialize the target virtual environment, where a callback function (for example, an iGraphicsGameSceneInit function) for obtaining a process name of a process is set in the eglInitialize interface. Then, a name of the target virtual environment is determined based on a preset correspondence between a process name and a name of a target virtual environment and by querying, through comparison, the correspondence for the process name of the current process. Optionally, the correspondence between a process name and a name of a target virtual environment may be stored in a form of an XML table.

For example, assuming that the target virtual environment is a game scene in a game application program, the XML table may be stored in the following manner:

```
<game_list>
  <game
      ProcessName="com.tent.tmgp.sgame"
      GameName="AAAA"
  />
```

-continued

```
   ...
   </game_list>
```

A name of the target virtual environment that corresponds to a process name "com.tent.tmgp.sgame" and that is stored in the XML table is "AAAA".

Optionally, when the terminal installed with a specified application program runs the specified application program for the first time, the scene recognition apparatus may obtain the first correspondence. In such a setting, the first correspondence stored in the terminal can be adaptive and automatically expanded, and the occupied memory space of the terminal can be reduced to a minimum. In addition, with upgrading and development of a specified application program, the terminal or the server associated with the target virtual environment can expand and upgrade a corresponding first correspondence, so that the scene recognition apparatus can obtain the first correspondence and implement recognition of a new scene.

Certainly, when the first correspondence satisfies a deletion condition, the first correspondence may be deleted. The deletion condition may be: The specified application program has been uninstalled, a user triggers a deletion instruction, or the like. This effectively reduces memory space occupied by the first correspondence in the terminal.

Step 103: The scene recognition apparatus determines a corresponding target scene based on the target object model.

In an optional example, the scene recognition apparatus may determine the corresponding target scene based on a target model identifier (that is, a model identifier of the target object model) by querying a correspondence or in another manner. For example, the scene recognition apparatus pre-stores a correspondence between a model identifier and a scene, and can find the target scene based on the identifier of the target object model.

In another optional example, the process of determining, by the scene recognition apparatus, the target scene corresponding to the obtained object model may include: The scene recognition apparatus determines, based on the target object model and a scene determining policy of the target object model in the target virtual environment, the target scene corresponding to the obtained object model. After the scene recognition apparatus determines the target virtual environment in step D1, the method may further include the following steps.

Step D3: The scene recognition apparatus obtains, from a plurality of relationship sets, the scene determining policy for the target virtual environment, where the plurality of relationship sets record different scene determining policies for a plurality of virtual environments, each virtual environment may correspond to a plurality of scene determining policies, and the scene determining policy is a policy for determining a corresponding scene based on an object model.

Similar to the first correspondence, the plurality of relationship sets may be stored in the local storage device of the terminal. For example, the plurality of relationship sets may be stored in the flash memory of the terminal (for example, when the terminal is a mobile terminal, the flash memory may be a multimedia card), or the first correspondence may be stored in the server associated with the target virtual environment, for example, stored on the cloud side associated with the target virtual environment. The process of obtaining, by the scene recognition apparatus from a plurality of relationship sets, the scene determining policy for the target virtual environment may include: querying whether the local storage device stores the scene determining policy for the target virtual environment; and when the local storage device does not store the scene determining policy for the target virtual environment, downloading the scene determining policy for the target virtual environment from the server associated with the target virtual environment. The downloaded scene determining policy for the target virtual environment may be stored in the local storage device. In addition, with upgrading and development of a specified application program, a corresponding scene determining policy can be expanded and upgraded in the plurality of relationship sets, so that the scene recognition apparatus obtains the scene determining policy and implements recognition of a new scene. The scene determining policy in the plurality of relationship sets may be newly added or modified depending on an actual requirement, and the scene determining policy in the plurality of relationship sets may be a key scene in the specified application program, or the like.

Certainly, when the scene determining policy satisfies a deletion condition, the scene determining policy is deleted. The deletion condition may be: The specified application program has been uninstalled, a user triggers a deletion instruction, or the like. This effectively reduces memory space occupied by the scene determining policy in the terminal.

Figure 4:
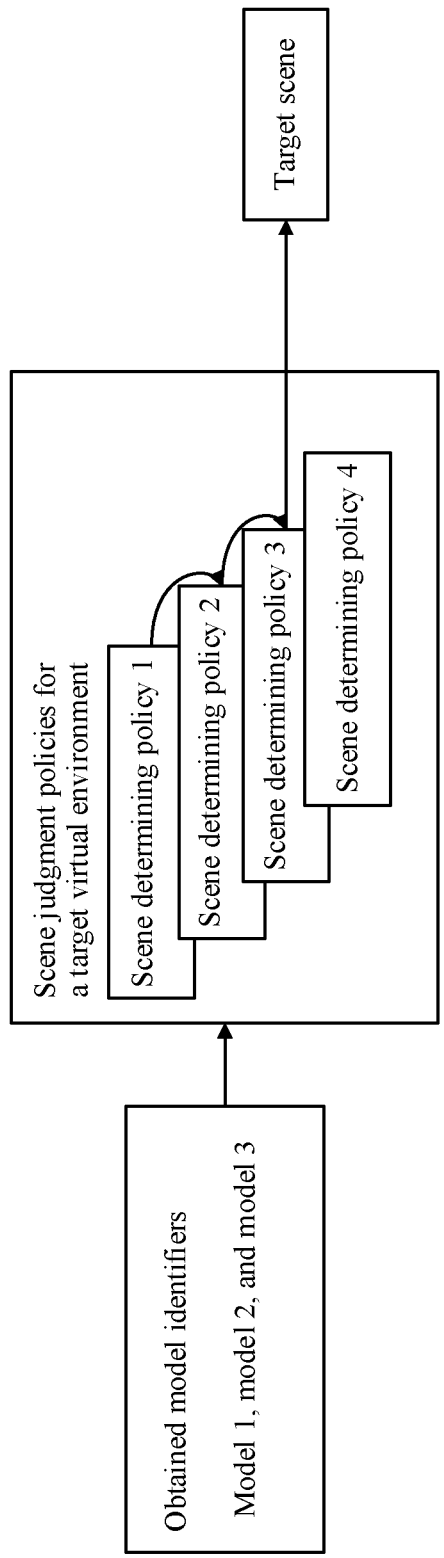
FIG. 4 is a schematic diagram of determining a corresponding target scene based on obtained model identifiers according to an embodiment of this application.

FIG. 4 is a schematic diagram of determining a corresponding target scene by the scene recognition apparatus based on model identifiers. The scene recognition apparatus determines the target scene based on the model identifier obtained in step 102 and the obtained scene determining policy for the target virtual environment. The obtained model identifiers are a "model 1", a "model 2", and a "model 3", and the obtained scene determining policies for the target virtual environment includes four scene determining policies: a "scene determining policy 1", a "scene determining policy 2", a "scene determining policy 3", and a "scene determining policy 4". A correspondence between a target scene and the model identifiers, that is, the "model 1", the "model 2", and the "model 3", is stored in the "scene determining policy 3". In this case, the target scene corresponding to the obtained model identifiers can be determined based on the "scene determining policy 3".

Optionally, the target virtual environment may be a gaming environment, and the scene determining policy includes one or more of the following: When the target object model includes a gun and a bullet, determining that the target scene is a gun shooting scene. Alternatively, when the target object model includes at least three roles, determining that the target scene is a group battle scene, where the roles may optionally be hero roles or the like. Alternatively, when the target object model in the first image frame does not include a target role and a target object model in a previous image frame of the first image frame includes the target role, determining that the target scene is a scene in which the target role appears, where the target role may optionally be an enemy role.

Figure 5:
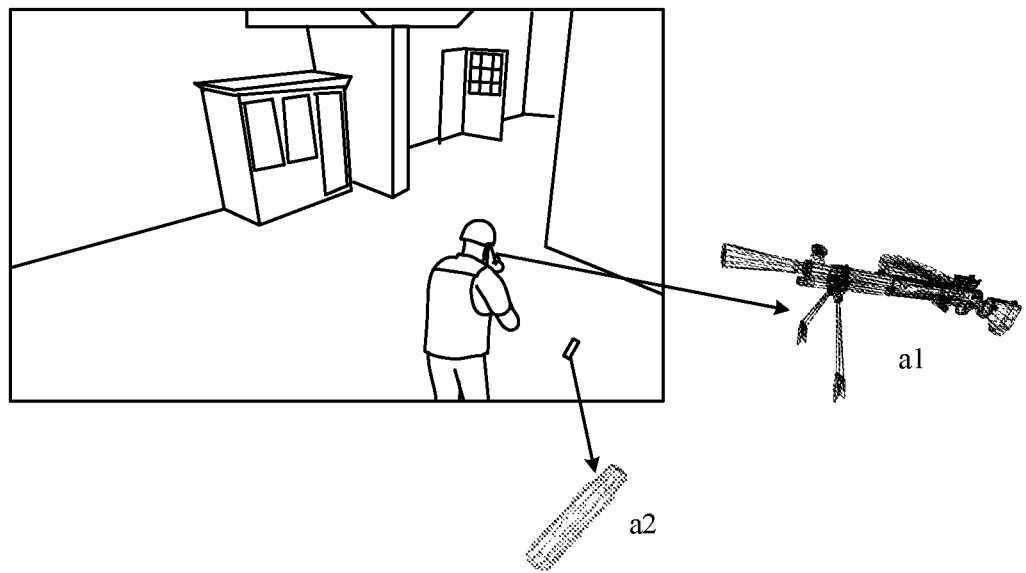
FIG. 5 is a schematic diagram of a target scene being a gun shooting scene according to an embodiment of this application.

For example, FIG. 5 is a schematic diagram of a target scene being a gun shooting scene. According to step 101 and step 102, it may be determined that model identifiers of the object described by the description parameter are a "gun" a1 and a "bullet" a2. Based on the foregoing scene determining policy, it may be determined that the target scene is the gun shooting scene. FIG. 5 illustratively shows an object model of the "gun" a1 and an object model of the "bullet" a2.

Figure 6:
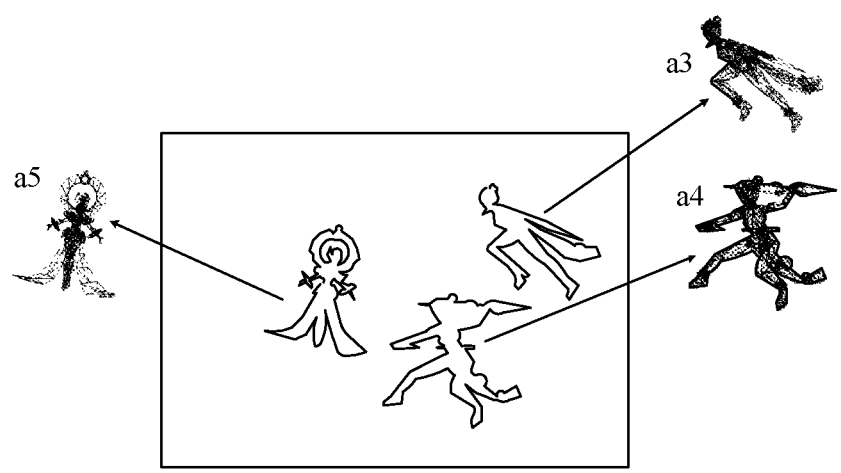
FIG. 6 is a schematic diagram of a target scene being a group battle scene according to an embodiment of this application.

For example, FIG. 6 is a schematic diagram of a target scene being a group battle scene. According to step 101 to step 103, it may be learnt that model identifiers of the object described by using the determined description parameter are a hero a3, a hero a4, and a hero a5. Based on the foregoing scene determining policy, it may be determined that the target scene is the group battle scene. FIG. 6 illustratively shows an object model of the hero a3, an object model of the hero a4, and an object model of the hero a5. A corresponding special effect may be added for the target scene. For example, a gathering help-seeking message is automatically sent to a teammate using a game SDK interface. In this way, when a user uses the specified application program, the group battle scene can be automatically recognized and the teammate can be notified of gathering team-fight information in time, without a user operation. This increases a winning probability in the group battle, thereby improving user experience.

Because the terminal does not need to perform additional calculation, load of the terminal is relatively light, and the terminal can recognize a large-scale complex scene in real time. For example, the scene is a three-dimensional scene at 60 frames per second in a gaming environment.

In some embodiments of this application, in an actual implementation, an interface used to query a current scene recognition result may be set at an API interface layer of an operating system of the terminal, and the interface used to query the current scene recognition result can be called to perform the scene recognition method provided in this embodiment of this application, to accurately obtain a current scene. When a module for enhancing a special effect of a game is disposed in a specified application program, the module can call the interface used to query a current scene recognition result, to accurately set a special effect for each scene, thereby improving user experience. When a module for placing an advertisement is disposed in a specified application program, the module can call the interface used to query a current scene recognition result, to accurately place an advertisement for each scene. The advertisement may be a third-party advertisement unrelated to the specified application program, and purposefully placing the advertisement can effectively increase the profit of an advertiser. Alternatively, the advertisement may be an internal advertisement related to the specified application program. For example, in a fighting scene in a game application program, a placed advertisement may be virtual-equipment selling advertisement. This can improve user experience of playing the game.

It should be noted that, in the foregoing scene determining policy corresponding to the target scene determined as a scene in which an enemy appears, the first image frame includes two image frames. If an "enemy" role (that is, a model indicated by a model identifier is "enemy", for example, the model identifier is "enemy") appears at a relatively far location in a game scene in a gaming environment, the "enemy" role displayed on a terminal having a relatively small display screen is small in size. Consequently, it is difficult for a user to recognize the "enemy" role by naked eyes, and it is difficult for the user to determine the current target scene.

Figure 7:
FIG. 7 is a schematic diagram of a target scene being a scene in which an enemy appears according to an embodiment of this application.

For example, FIG. 7 is a schematic diagram of a target scene being a scene in which an enemy appears. The left side of FIG. 7 shows an image frame in which there is an enemy role, and the right side of FIG. 7 shows an image obtained after the enemy role in the image frame is amplified. It can be clearly seen from FIG. 7 that, when the enemy role is at a relatively far location in a picture, it is difficult to notice the enemy role by naked eyes. However, from a perspective of a drawing instruction, for a same object, drawing instructions used for drawing the object are the same when the object is seen at a distance or nearby. Therefore, by determining the drawing instructions that are used for drawing the "enemy" role and that are in two consecutive image frames, it may be determined that the target scene is a scene in which an enemy appears. A corresponding special effect may be added for the target scene. For example, alarm information is presented, where the alarm information may be presented in a form of a voice, vibration, an optical signal, or a logo image. For example, a red flashing alarm appears at edges of a screen and lasts for three seconds. Certainly, the scene determining policy may also be used for recognizing a tiny figure, a tiny object, or the like at a distance in a scene. The scene determining policy is effectively applicable to a terminal having a relatively small screen, for example, a mobile terminal. This is conducive to improving user experience.

Optionally, in some embodiments of this application, in an actual implementation, if the scene recognition apparatus in the terminal continuously uses the scene recognition method for scene recognition in a process of running an application program, performance of the operating system of the terminal is affected and a resource of the operating system of the terminal is occupied. In view of this, a corresponding switch can be set specific to the scene recognition method, where the switch may be corresponding to an enabled/disabled status of the scene recognition method. Before step 101 is performed, the scene recognition apparatus may further determine a current enabled/disabled status of the scene recognition method; and when the enabled/disabled status of the scene recognition method is an enabled state, perform the scene recognition method including step 101 to step 103. The enabled state may be enabled by a user or automatically enabled by the scene recognition apparatus.

It should be noted that in step 102, if the first implementation is used to obtain the object model of the object described by the determined description parameter, selection may be first performed on the vertex set of the one or more known object models based on the first vertex quantity of the obtained vertex set, to obtain the at least one candidate vertex set; and then the obtained vertex set may be compared one by one with the at least one candidate vertex set, to obtain the target vertex set that has the same content as the obtained vertex set. Because vertex quantities of different object models are usually different, first performing selection based on vertex quantities can rapidly and efficiently exclude most vertex sets that do not match an obtained vertex set, and on this basis, performing selection based on vertex sets can accurately obtain an object identifier of an object described by a determined description parameter. Further, in step 103 performed based on this, the process of determining the target scene can also be more efficient, and the target scene can also be determined more accurately.

Further, the scene recognition method provided in this embodiment of this application can efficiently implement scene recognition without consuming a large quantity of computing resources, and therefore the terminal can use the scene recognition method for scene recognition in real time.

Figure 8:
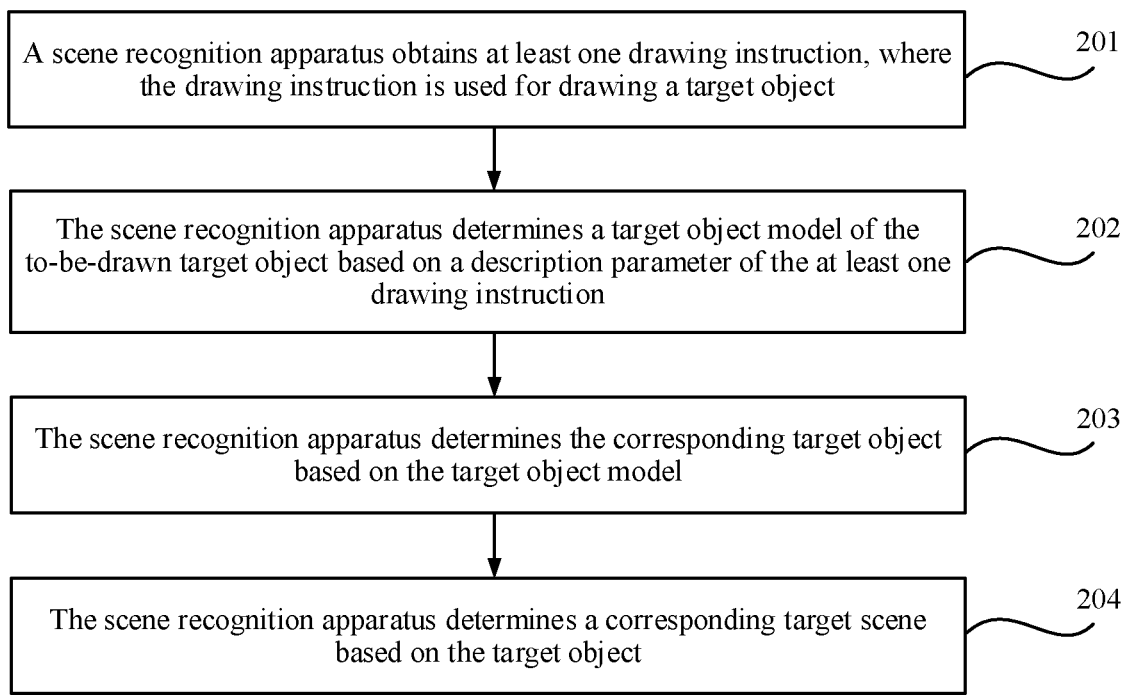
FIG. 8 is a flowchart of a scene recognition method according to an embodiment of this application.

It should be noted that, because a target object corresponds to at least one target object model, and a target object identifier can uniquely identify a target object. Therefore, an object identifier of a target object may correspond to an identifier of at least one target object model. According to the scene recognition method provided in some embodiments of this application, in a first optional implementation, after determining a target object model of a to-be-drawn target object based on a description parameter, the scene recognition apparatus can determine a target scene directly based on the target object model. In a second optional implementation, after determining a target object model of a to-be-drawn target object based on a description parameter, the scene recognition apparatus first determines the target object (that is, determines a target object identifier) based on the target object model, and then determines a target scene based on the target object. The foregoing embodiment is described using the first optional implementation as an example, and the following embodiment is briefly described using the second optional implementation as an example. As shown in FIG. 8, the scene recognition method includes the following steps.

Step 201: A scene recognition apparatus obtains at least one drawing instruction, where the drawing instruction is used for drawing a target object.

For a specific process of step 201, reference may be made to step 101. Details are not described in this embodiment of this application again.

Step 202: The scene recognition apparatus determines a target object model of the to-be-drawn target object based on a description parameter of the at least one drawing instruction.

For a specific process of step 202, reference may be made to step 102. Details are not described in this embodiment of this application again.

Step 203: The scene recognition apparatus determines the corresponding target object based on the target object model.

For example, the scene recognition apparatus may determine the corresponding target object based on the target object model by querying a correspondence or in another manner. The correspondence may be stored in a tabular form. For example, an index number of the determined target object model is 26, and an object identifier of the target object is obtained by querying Table 1, that is, "soldier".

Step 204: The scene recognition apparatus determines a corresponding target scene based on the target object.

In an optional example, the scene recognition apparatus may determine the corresponding target scene based on a target object identifier (that is, an object identifier of the target object) by querying a correspondence or in another manner. For example, the scene recognition apparatus pre-stores a correspondence between an object identifier and a scene, and can find the target scene based on the object identifier of the target object.

In another optional example, the process of determining, by the scene recognition apparatus, the target scene corresponding to the obtained target object may include: The scene recognition apparatus determines, based on a target object identifier and a scene determining policy of the target object identifier in the target virtual environment, the target scene corresponding to the obtained target object. Before step 201, the scene recognition apparatus obtains, from a plurality of relationship sets, the scene determining policy for the target virtual environment, where the plurality of relationship sets record different scene determining policies for a plurality of virtual environments, each virtual environment may be corresponding to a plurality of scene determining policies, and the scene determining policy is a policy for determining a corresponding scene based on an object identifier. For the process of obtaining the scene determining policy, reference may be made to step D3. Same as the foregoing first implementation, when the scene determining policy satisfies a deletion condition, the scene determining policy is deleted.

It should be noted that, when an object is in a one-to-one correspondence with an object model, an object identifier and a model identifier may be a same identifier. In this case, a process of determining a target object is basically consistent with a process of determining a target object model.

It should be noted that a sequence of the steps of the scene recognition method in this embodiment of this application may be appropriately adjusted, and the steps may also be correspondingly added or deleted depending on a situation. All variant methods readily figured out by a person skilled in the art within the technical scope disclosed in this application shall fall within the protection scope of this application, and therefore are not described.

In summary, according to the scene recognition methods provided in the embodiments of this application, the at least one drawing instruction used for drawing the object in the first image frame is obtained, the description parameter used for describing the object corresponding to each of the at least one drawing instruction is determined based on each drawing instruction, and finally the corresponding target scene is determined based on the object model of the object described by the determined description parameter. The target scene is determined based on the description parameter that is determined based on the drawing instruction. In this case, the terminal does not need to perform additional calculation. Compared with the related technology in which a large quantity of computing resources are consumed by using an image recognition technology, the scene recognition methods provided in the embodiments of this application effectively reduce consumption of system resources.

Moreover, the scene recognition methods provided in the embodiments of this application do not rely on application programming interfaces provided by terminal manufacturers and do not rely on logical laws of game designs either, and therefore have platform generality for operating systems using the OpenGL.

Figure 9:
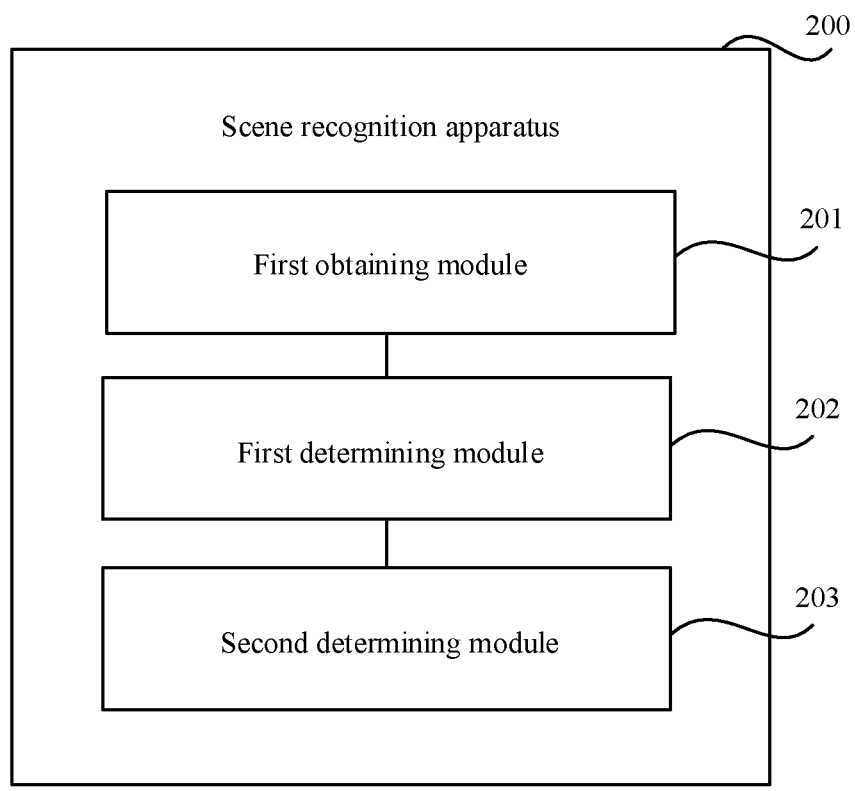
FIG. 9 is a schematic structural diagram of a scene recognition apparatus according to an embodiment of this application.

Referring to FIG. 9, an embodiment of this application provides a scene recognition apparatus 200. The apparatus 200 includes:
 a first obtaining module 201, configured to obtain at least one drawing instruction, where the drawing instruction is used for drawing a target object;
 a first determining module 202, configured to determine a target object model of the to-be-drawn target object based on a description parameter of the at least one drawing instruction, where the target object model is a rendering model used for image drawing, and the description parameter indicates vertex information of the target object model; and
 a second determining module 203, configured to determine a corresponding target scene based on the target object model.

Optionally, the target object model is obtained by matching the vertex information with vertex information of one or more known object models.

Figure 10:
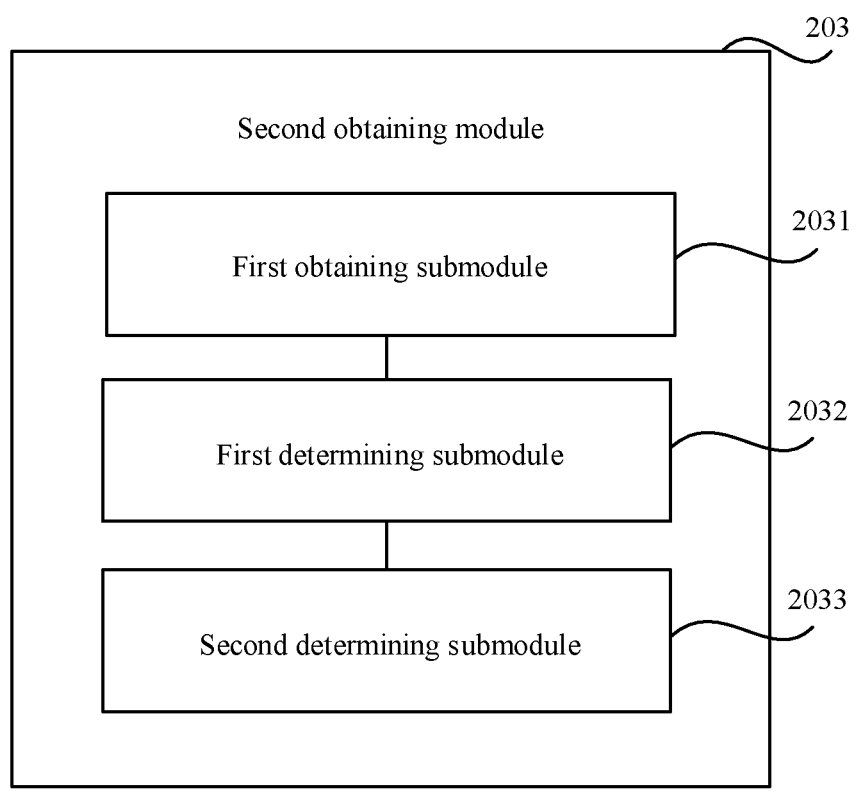
FIG. 10 is a schematic structural diagram of a second obtaining module according to an embodiment of this application.

Optionally, the vertex information includes a vertex set, and one vertex set includes coordinate values of one or more vertices. FIG. 10 is a schematic structural diagram of a first determining module 202 according to an embodiment of this application. The first determining module 202 includes:
 a first obtaining submodule 2031, configured to obtain m vertex sets from the description parameter, where m is a positive integer;

a first determining submodule 2032, configured to determine, from the m vertex sets, a target vertex set that matches a vertex set of the one or more known object models; and a second determining submodule 2033, configured to determine an object model corresponding to the target vertex set as the target object model.

Optionally, the first determining submodule 2032 is configured to determine a vertex set in the m vertex sets that has same content and a same quantity of vertices as the vertex set of the one or more known object models, as the target vertex set.

Optionally, the first obtaining submodule 2031 is configured to:

obtain all vertex sets included in the description parameter; or select some vertex sets in the description parameter to obtain the m vertex sets.

Optionally, the vertex information includes a vertex quantity, and the target object model is an object model, whose vertex quantity is equal to a vertex quantity indicated by the description parameter, in the known object model.

Optionally, the vertex information includes a vertex quantity, and the target object model is the object model, whose vertex quantity is equal to the vertex quantity indicated by the description parameter, in the known object model.

Optionally, the first obtaining module 201 is configured to obtain the at least one drawing instruction by listening on an OpenGL interface, where the OpenGL interface is an interface between an OpenGL and an application program.

Figure 11:
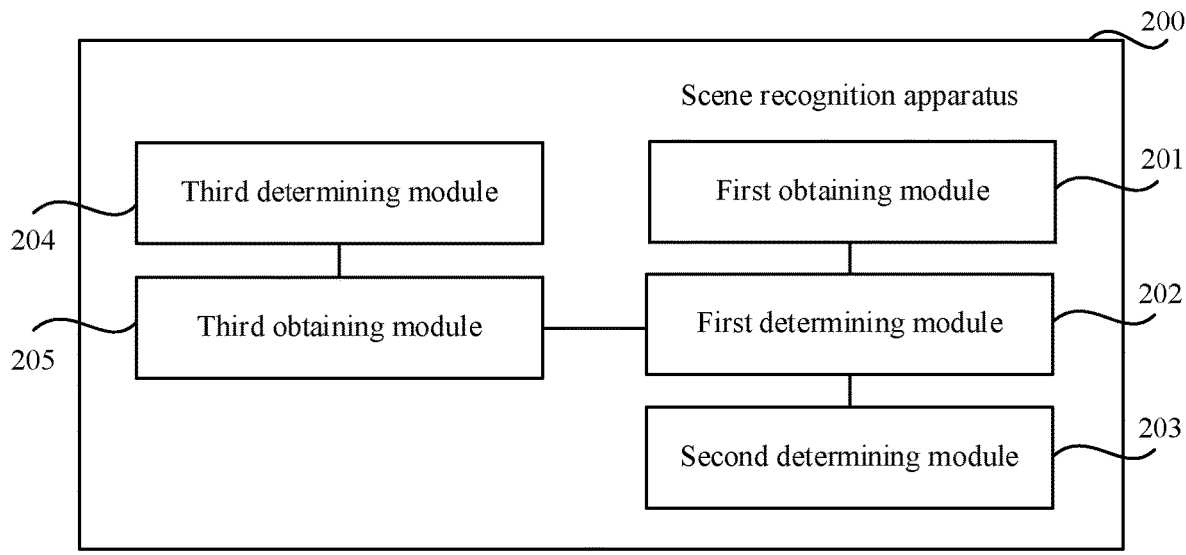
FIG. 11 is a schematic structural diagram of another scene recognition apparatus according to an embodiment of this application.

Optionally, referring to FIG. 11, an embodiment of this application provides a scene recognition apparatus 200. The apparatus 200 further includes:

a third determining module 204, configured to: before the target object model of the to-be-drawn target object is determined based on the description parameter of the at least one drawing instruction, determine a target virtual environment, where the target virtual environment is a virtual environment to which a first image frame belongs, and the first image frame is an image frame to which the target object to be drawn by using the at least one drawing instruction belongs; and a third obtaining module 205, configured to obtain a first correspondence that is between a description parameter and an object model and that corresponds to the target virtual environment; and the first determining module 202 is configured to query the first correspondence to obtain the target object model corresponding to the description parameter.

Figure 12:
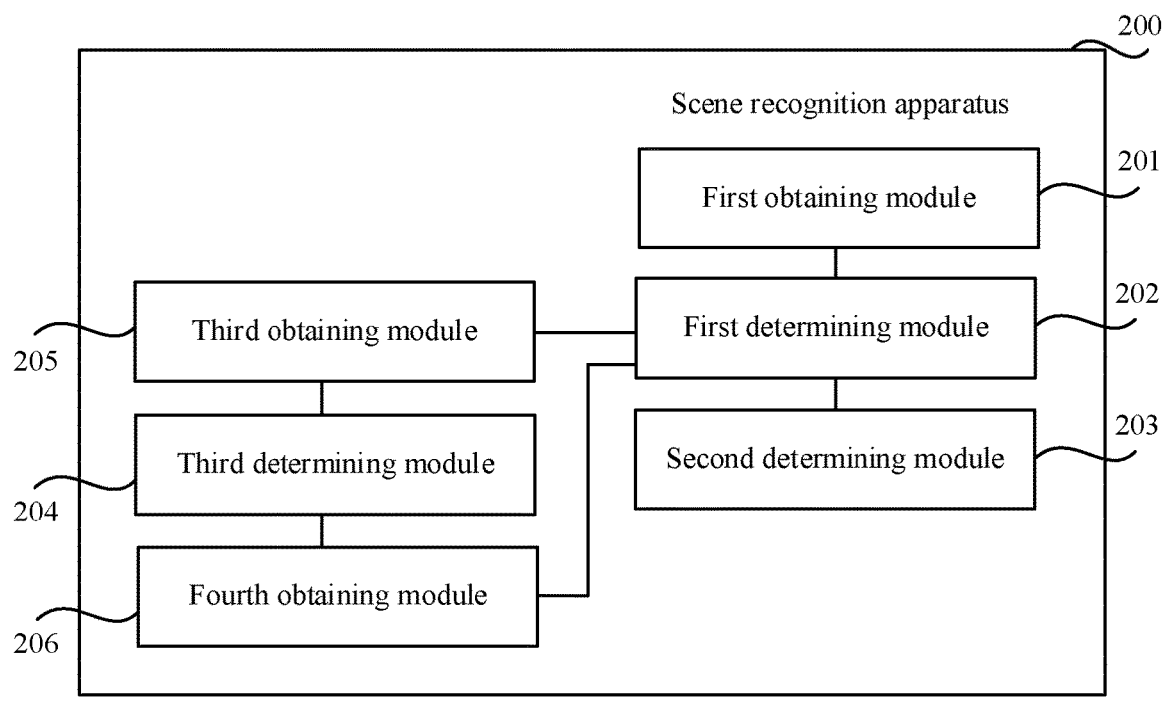
FIG. 12 is a schematic structural diagram of another scene recognition apparatus according to an embodiment of this application.

Optionally, referring to FIG. 12, the apparatus 200 further includes: a fourth obtaining module 206, configured to: after the target virtual environment is determined, obtain, from a plurality of relationship sets, a scene determining policy for the target virtual environment, where the plurality of relationship sets record different scene determining policies for a plurality of virtual environments, and the scene determining policy is a policy for determining a corresponding scene based on an object model; and the second determining module 203 is configured to:

determine the target scene based on the target object model and the scene determining policy of the target object model in the target virtual environment.

Optionally, the target virtual environment is a gaming environment, and the scene determining policy includes one or more of the following:

when the target object model includes a gun and a bullet, determining that the target scene is a gun shooting scene;

when the target object model includes at least three roles, determining that the target scene is a group battle scene; or when the target object model in the first image frame includes a target role and a target object model in a previous image frame of the first image frame does not include the target role, determining that the target scene is a scene in which the target role appears.

Optionally, the third obtaining module 205 is configured to:

query the first correspondence stored in a local storage device, or download the first correspondence from a server associated with the target virtual environment.

In summary, the scene recognition apparatus provided in this embodiment of this application obtains the at least one drawing instruction used for drawing the target object, determines the target object model of the to-be-drawn target object based on the description parameter of the at least one drawing instruction, and finally determines the corresponding target scene based on the target object model. The target scene is determined based on the target object model, and the target object model is determined based on the description parameter of the drawing instruction. In this case, the terminal does not need to perform additional calculation. Compared with a related technology in which a large quantity of computing resources are consumed by using an image recognition technology, a scene recognition method provided in this embodiment of this application effectively reduces system resources.

A person skilled in the art can clearly understand that the scene recognition apparatus embodiment and the scene recognition method embodiment are a same concept. For specific working processes of the described apparatus, modules, and submodules, reference may be made to corresponding processes in the foregoing method embodiments. Details are not described herein again.

In addition, the modules in the apparatus may be implemented by software, hardware, or a combination of software and hardware. When at least one module is hardware, the hardware may be an integrated logic circuit module, and may specifically include a transistor, a logic gate array, an algorithm logic circuit, or the like. When at least one module is software, the software exists in a form of a computer program product, and is stored in a computer readable storage medium. The software may be executed by a processor. Therefore, alternatively, the scene recognition apparatus may be implemented by a processor executing a software program. This is not limited in this embodiment.

Figure 13:
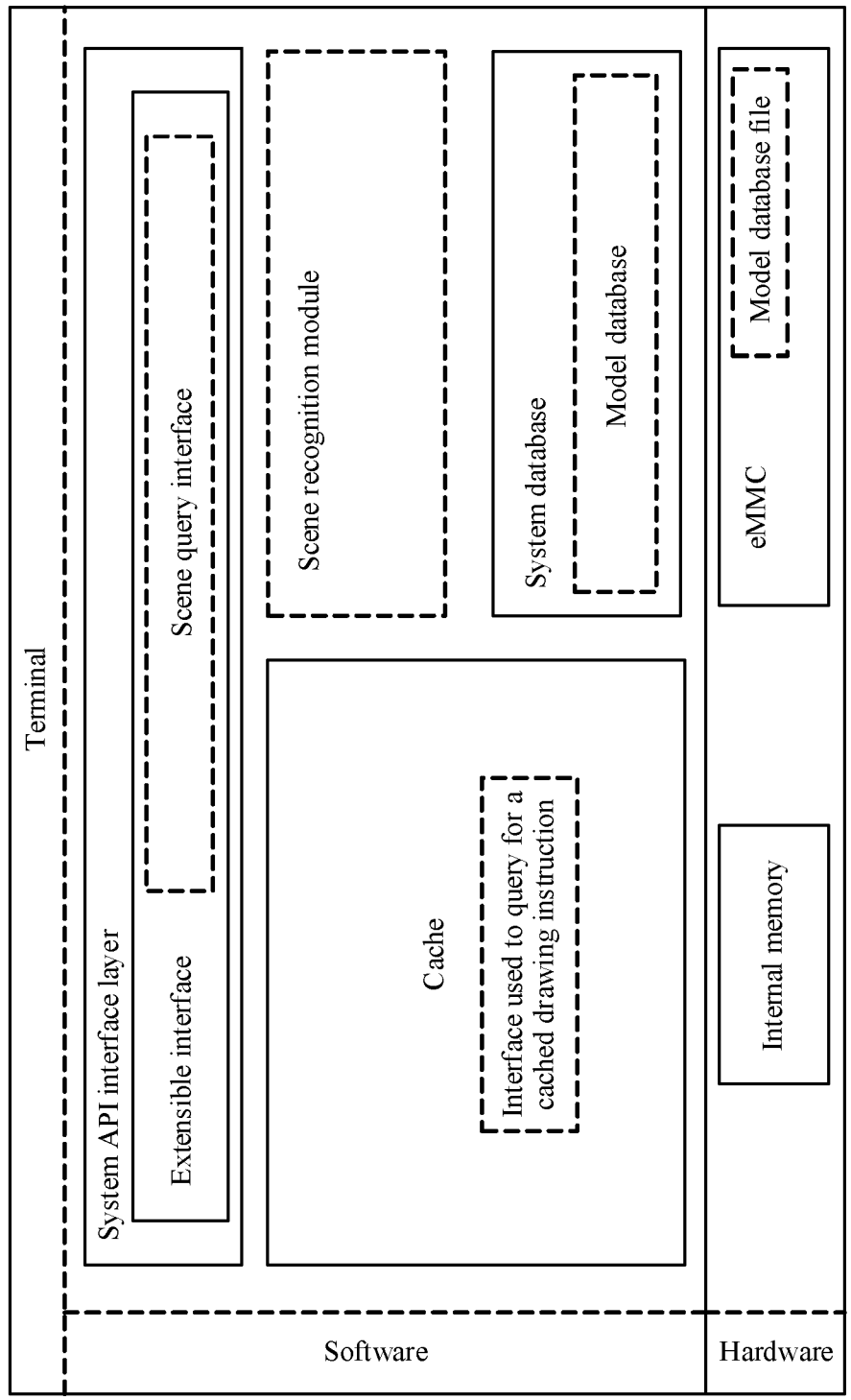
FIG. 13 is a schematic diagram of deployment forms of a scene recognition apparatus in software and hardware of a terminal according to an embodiment of this application.

Referring to FIG. 13, a terminal in FIG. 13 is divided into a software portion and a hardware portion. In the terminal, the software portion includes a cache, a system API interface layer, a scene recognition module, and a system database. The cache has an interface used to query a cached drawing instruction. In other words, the cache provides the scene recognition module with an interface used to query a cached drawing instruction for an image frame corresponding to a current scene. The system API interface layer includes an extensible interface, where the extensible interface includes a scene query interface, and another module may call the interface to query a scene corresponding to a current specified application. The system database includes a model database, where the model database separately stores, based on different application programs, description parameters of object models corresponding to common objects. The scene recognition module analyzes an obtained drawing instruction, performs comparative matching with models in the model database, and recognizes a current scene through determining. The scene recognition module can implement functions of the foregoing scene recognition apparatus. The hardware portion includes an internal memory and an eMMC, where the eMMC includes a model database file.

Figure 14:
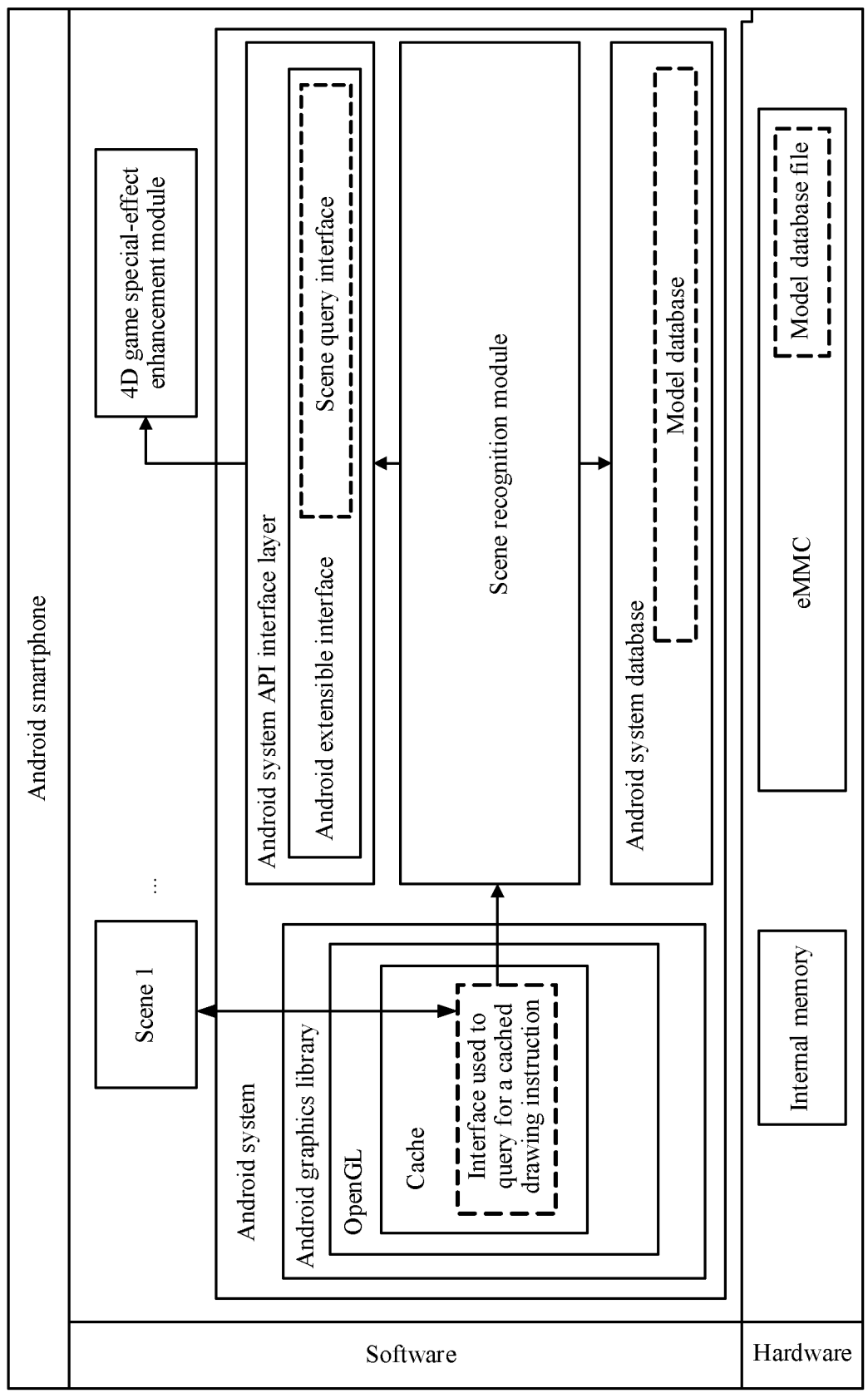
FIG. 14 is a schematic diagram of deployment forms of a scene recognition apparatus in software and hardware of a terminal according to an embodiment of this application.

For example, the terminal is a smartphone and an operating system of the smartphone is an Android (Android) system. Referring to FIG. 14, a terminal in FIG. 14 is divided into a software portion and a hardware portion. In the Android smartphone, the software portion includes a cache, a system API interface layer, a scene recognition module, and a system database. The system API interface layer includes an Android extensible interface, where the extensible interface includes a scene query interface. For example, a 4D game special-effect enhancement module may be disposed on the smartphone. The 4D game special-effect enhancement module may call the scene query interface to query for a current scene, and add a 4D special effect such as vibration or a special sound effect based on the scene. For structures and functions of the cache, the system database, and the scene recognition module, reference may be made to FIG. 13. For a structure and a function of the hardware portion, reference may be made to FIG. 13.

An embodiment of this application further provides a scene recognition apparatus, including a processor and a memory. When the processor executes a computer program stored in the memory, the scene recognition apparatus performs the scene recognition method provided in the embodiments of this application. Optionally, the scene recognition apparatus may be deployed in an electronic imaging device.

An example embodiment of this application further provides a terminal. The terminal may include a processor and a memory that is configured to store a computer program that can be run on the processor. When executing the computer program, the processor is configured to implement any one of the scene recognition methods provided in the foregoing embodiments of this application. For example, the processor is configured to: obtain at least one drawing instruction, where the drawing instruction is an instruction used for drawing an object in a first image frame; determine a description parameter used for describing an object corresponding to each of the at least one drawing instruction based on each drawing instruction; obtain an object identifier of the object described by using the determined description parameter; and determine a target scene corresponding to the obtained object identifier.

Figure 15:
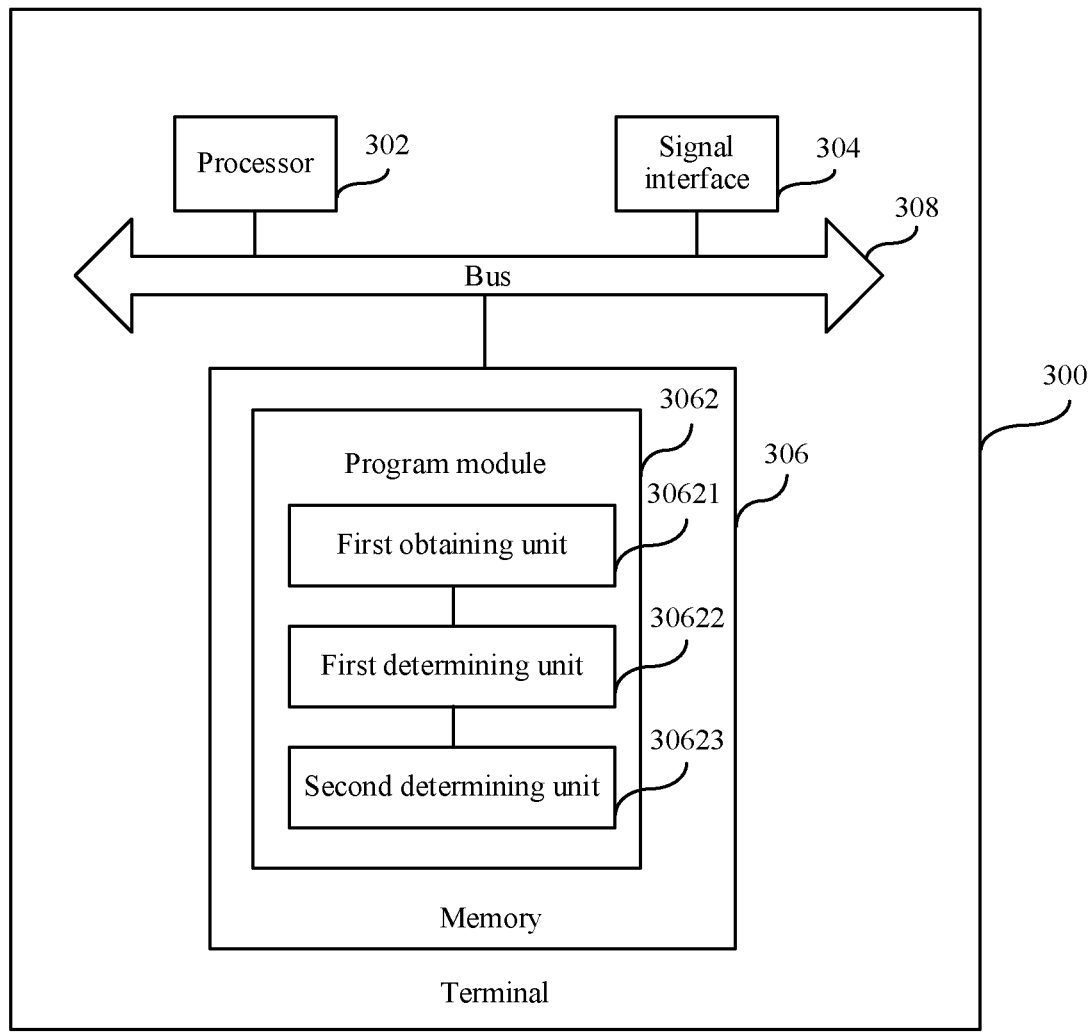
FIG. 15 is a schematic structural diagram of a terminal according to an embodiment of this application.

Specifically, FIG. 15 is a schematic structural diagram of a terminal 300 in the example embodiments of this application. The terminal 300 may include a processor 302 and a signal interface 304.

The processor 302 includes one or more processing cores. The processor 302 performs various function applications and data processing by running a software program and a module. The processor 302 may include a CPU and a GPU, and may further optionally include a hardware accelerator required for calculation, for example, various logical operation circuits.

There may be a plurality of signal interfaces 304. The signal interface 304 is configured to establish a connection to another apparatus or module. For example, the signal interface 304 may be connected to a transceiver. In this case, optionally, the apparatus 300 may further include the transceiver (not shown in the figure). The transceiver specifically performs signal receiving/sending. When the processor 302 needs to perform a signal receiving/sending operation, the transceiver may be called or driven to perform the corresponding receiving/sending operation. Therefore, when the apparatus 300 performs signal receiving/sending, the processor 302 is configured to decide or initiate a receiving/sending operation and is equivalent to an initiator, while the transceiver is configured to perform specific receiving/sending and is equivalent to an executor. The transceiver may alternatively be a transceiver circuit, a radio frequency circuit, or a radio frequency unit. This is not limited in this embodiment.

Optionally, the terminal 300 further includes components such as a memory 306 and a bus 308. Both the memory 306 and the signal interface 304 are connected to the processor 302 through the bus 308.

The memory 306 may be configured to store the software program and the module. Specifically, the memory 306 may store a program module 3062 required by at least one function. The memory may be a random-access memory (RAM) or a double data rate (DDR) memory. The program may be an application program or a driver.

The program module 3062 may include:
a first obtaining module 30621 that has a function the same as or similar to that of the first obtaining module 201;
a first determining module 30622 that has a function the same as or similar to that of the first determining module 202; and
a second determining module 30623 that has a function the same as or similar to that of the second determining module 203.

An embodiment of this application further provides a storage medium. The storage medium may be a nonvolatile or non-transitory computer readable storage medium, and the storage medium stores a computer program. The computer program indicates a terminal to perform any one of the scene recognition methods provided in the embodiments of this application. The storage medium may include any medium that can store program code, such as a read-only memory (ROM), a random-access memory (RAM), a magnetic disk, or an optical disc.

An embodiment of this application further provides a computer program product including an instruction. When the computer program product is run on a computer, the computer is enabled to perform the scene recognition methods provided in the embodiments of this application. The computer program product may include one or more computer instructions. When the computer program instruction is loaded and executed on the computer, all or some of the procedures or functions according to the embodiments of this application are generated. The computer may be a general-purpose computer, a dedicated computer, a computer network, or other programmable apparatus. The computer instruction may be stored in a computer readable storage medium, or may be transmitted by using the computer readable storage medium. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be noted that, when the scene recognition apparatus provided in the foregoing embodiment performs scene recognition, division of the foregoing function modules is only used as an example for description. In actual application, the foregoing functions may be allocated to different function modules for implementation according to a requirement, that is, an inner structure of a terminal is divided into different function modules to implement all or some of the functions described above.

The sequence numbers of the foregoing embodiments of this application are only for descriptive purposes, and are not intended to indicate priorities of the embodiments.

A person of ordinary skill in the art can understand that all or some of the steps for implementing the embodiments may be implemented by hardware or a program instructing related hardware. The program may be stored in a computer readable storage medium. The storage medium may be a read-only memory, a magnetic disk, an optical disc, or the like.

The foregoing descriptions are only optional embodiments of this application, but are not intended to limit this application. Any modification, equivalent replacement, improvement, or the like made without departing from the spirit and principle of this application shall fall within the protection scope of this application.

What is claimed is:

1. A scene recognition method, wherein the method comprises:
    obtaining at least one drawing instruction, wherein the drawing instruction is used for drawing a target object;
    determining, based on a description parameter of the at least one drawing instruction, a target object model of the to-be-drawn target object, wherein the target object model is a rendering model used for image drawing, and the description parameter indicates vertex information of the target object model; and
    determining, based on the target object model, a corresponding target scene;
    wherein the target object model is obtained by matching the vertex information with vertex information of one or more known object models;
    wherein the vertex information comprises a vertex quantity, and the target object model is an object model in the one or more known object models whose vertex quantity is equal to a vertex quantity indicated by the description parameter.

2. The method according to claim 1, wherein the vertex information further comprises m vertex sets, and each vertex set comprises coordinate values of one or more vertices; and the determining, based on a description parameter of the at least one drawing instruction, a target object model of the to-be-drawn target object comprises:
    obtaining the m vertex sets from the description parameter, wherein m is a positive integer;
    determining, from the m vertex sets, a target vertex set that matches a vertex set of the one or more known object models; and
    determining an object model corresponding to the target vertex set as the target object model.

3. The method according to claim 2, wherein the determining, from the m vertex sets, a target vertex set that matches a vertex set of the one or more known object models comprises:
    determining a vertex set in the m vertex sets that has a same content and a same quantity of vertices of the vertex set of the one or more known object models, as the target vertex set.

4. The method according to claim 2, wherein the obtaining m vertex sets from the description parameter comprises:
    obtaining all vertex sets comprised in the description parameter; or
    selecting some vertex sets in the description parameter to obtain the m vertex sets.

5. The method according to claim 1, wherein the target object model further satisfies the following condition: the target object model matches a target virtual environment, wherein the target virtual environment is a two-dimensional or three-dimensional virtual environment established by an application program that generates the at least one drawing instruction.

6. The method according to claim 1, wherein the obtaining at least one drawing instruction comprises: obtaining the at least one drawing instruction by listening on an OpenGL interface, wherein the OpenGL interface is an interface between an OpenGL and an application program.

7. The method according to claim 1, wherein before the determining, based on a description parameter of the at least one drawing instruction, a target object model of the to-be-drawn target object, the method further comprises:
    determining a target virtual environment, wherein the target virtual environment is a virtual environment to which a first image frame belongs, and the first image frame is an image frame to which the target object to be drawn by using the at least one drawing instruction belongs;
    obtaining a first correspondence between a description parameter and an object model in the target virtual environment; and
    the determining, based on a description parameter of the at least one drawing instruction, a target object model of the to-be-drawn target object comprises:
    querying the first correspondence to obtain the target object model corresponding to the description parameter.

8. The method according to claim 7, wherein after the determining a target virtual environment, the method further comprises:
    obtaining, from a plurality of relationship sets, a scene determining policy for the target virtual environment, wherein the plurality of relationship sets record scene determining policies for a plurality of virtual environments, and the scene determining policy is a policy for determining a corresponding scene based on an object model; and
    wherein the determining, based on the target object model, a corresponding target scene comprises:
    determining, based on the target object model and the scene determining policy of the target object model in the target virtual environment, the target scene.

9. The method according to claim 8, wherein the target virtual environment is a gaming environment, and the scene determining policy comprises one or more of the following:
    when the target object model comprises object models respectively corresponding to a gun and a bullet, determining that the target scene is a gun shooting scene; or
    when the target object model comprises object models respectively corresponding to at least three roles, determining that the target scene is a group battle scene; or
    when the target object model in the first image frame comprises a target role and a target object model in a previous image frame of the first image frame comprising the target role, determining that the target scene is a scene in which the target role appears.

10. The method according to claim 7, wherein the obtaining a first correspondence between a description parameter and an object model in the target virtual environment comprises:

querying the first correspondence stored in a local storage device, or downloading the first correspondence from a server associated with the target virtual environment.

11. A terminal, comprising one or more processors and a memory, wherein
the one or more processors executes instructions stored in the memory to:
obtain at least one drawing instruction, wherein the drawing instruction is used for drawing a target object;
determine, based on a description parameter of the at least one drawing instruction, a target object model of the to-be-drawn target object, wherein the target object model is a rendering model used for image drawing, and the description parameter indicates vertex information of the target object model; and
determine, based on the target object model, a corresponding target scene;
wherein the target object model is obtained by matching the vertex information with vertex information of one or more known object models;
wherein the vertex information comprises a vertex quantity, and the target object model is an object model in the one or more known object models whose vertex quantity is equal to a vertex quantity indicated by the description parameter.

12. The terminal according to claim 11, wherein the vertex information further comprises m vertex sets, and each vertex set comprises coordinate values of one or more vertices; and
the processor executes the instructions stored in the memory further to:
obtain m vertex sets from the description parameter, wherein m is a positive integer;
determine, from the m vertex sets, a target vertex set that matches a vertex set of the one or more known object models; and
determine an object model corresponding to the target vertex set as the target object model.

13. The terminal according to claim 11, wherein the target object model further satisfies the following condition: the target object model matches a target virtual environment, wherein the target virtual environment is a two-dimensional or three-dimensional virtual environment established by an application program that generates the at least one drawing instruction.

14. A non-transitory storage medium, comprising instructions that when the instructions are performed by one or more processors cause the one or more processors to:
obtain at least one drawing instruction, wherein the drawing instruction is used for drawing a target object;
determine, based on a description parameter of the at least one drawing instruction, a target object model of the to-be-drawn target object, wherein the target object model is a rendering model used for image drawing, and the description parameter indicates vertex information of the target object model; and
determine, based on the target object model, a corresponding target scene;
wherein the target object model is obtained by matching the vertex information with vertex information of one or more known object models;
wherein the vertex information comprises a vertex quantity, and the target object model is an object model in the one or more known object models whose vertex quantity is equal to a vertex quantity indicated by the description parameter.

15. The non-transitory storage medium according to claim 14, wherein the target object model further satisfies the following condition: the target object model matches a target virtual environment, wherein the target virtual environment is a two-dimensional or three-dimensional virtual environment established by an application program that generates the at least one drawing instruction.

* * * * *